United States Patent
Michael et al.

(10) Patent No.: US 9,923,745 B2
(45) Date of Patent: Mar. 20, 2018

(54) SIGNALING METHODS AND APPARATUS

(71) Applicant: Sony Corporation, Tokyo (JP)

(72) Inventors: Lachlan Michael, Saitama (JP); Yuken Goto, Tokyo (JP); Tatsuki Amimoto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/404,840

(22) Filed: Jan. 12, 2017

(65) Prior Publication Data
US 2017/0187559 A1    Jun. 29, 2017

Related U.S. Application Data

(63) Continuation of application No. 14/746,541, filed on Jun. 22, 2015, now Pat. No. 9,590,782.

(51) Int. Cl.
*H04L 27/26*     (2006.01)
*H04L 5/00*      (2006.01)

(52) U.S. Cl.
CPC ........ *H04L 27/2613* (2013.01); *H04L 5/0044* (2013.01)

(58) Field of Classification Search
CPC ... H04L 27/26; H04L 27/2626; H04L 5/0048; H04N 21/007; H04N 21/06; H04N 21/08; H04N 21/4432; G06F 9/4401; G01N 2500/02; G01N 2510/00; G01N 33/574
See application file for complete search history.

(56) References Cited

U.S. PATENT DOCUMENTS

| 9,210,651 B2* | 12/2015 | Teague .................. H04W 48/12 |
| 2005/0233709 A1 | 10/2005 | Gardner et al. |
| 2008/0212688 A1* | 9/2008 | Aue .................. H04W 52/0216 375/240.26 |
| 2011/0002422 A1* | 1/2011 | Cheng ................. H04L 27/2659 375/343 |
| 2011/0044401 A1 | 2/2011 | Ko et al. |

(Continued)

FOREIGN PATENT DOCUMENTS

KR    10-2015-0035366 A    4/2015

OTHER PUBLICATIONS

Search Report and Written Opinion dated Sep. 2, 2016 in International Application No. PCT/US16/36302.

(Continued)

*Primary Examiner* — Mohamed Kamara
(74) *Attorney, Agent, or Firm* — Oblon, McClelland, Maier & Neustadt, L.L.P.

(57) ABSTRACT

A transmission apparatus and transmitting method for signaling parameters of a preamble, and a reception apparatus and receiving method for decoding the preamble. The transmitting method includes generating, using processing circuitry of a transmission apparatus, a bootstrap symbol based on the parameters of the preamble. The bootstrap symbol is prefixed to a frame that includes the preamble using the circuitry. The bootstrap symbol is selected from a plurality of patterns. Further, the plurality of patterns represent at least a subset of predetermined combinations of the parameters of the preamble including an FFT (Fast Fourier Transform) size, a guard interval, a frequency domain displacement component of a SPP (Scattered Pilot Pattern) and a L1 mode.

24 Claims, 35 Drawing Sheets

(56) References Cited

U.S. PATENT DOCUMENTS

| | | | |
|---|---|---|---|
| 2013/0235952 A1* | 9/2013 | Ko | H04H 20/42 375/295 |
| 2014/0376650 A1 | 12/2014 | Vojcic et al. | |
| 2015/0139353 A1 | 5/2015 | Baek et al. | |
| 2015/0163557 A1 | 6/2015 | Kitazato | |
| 2015/0304070 A1 | 10/2015 | Baek et al. | |
| 2016/0226691 A1* | 8/2016 | Zhu | H04B 7/04 |

OTHER PUBLICATIONS

Korean Office Action dated Feb. 17, 2017 in Patent Application No. 10-2017-7002104 (with English Translation).
"ATSC Candidate Standard: System Discovery and Signaling", (Doc. A/321 Part 1), ATSC, May 6, 2015, 20 pages.
"Digital Video Broadcasting (DVB); Frame Structure Channel Coding and Modulation for a Second Generation Digital Terrestrial Television Broadcasting System (DVB-T2)", Draft ETSI EN 302 755 v.1.4.1, Aug. 2014, 189 pages.
Korean Office Action dated Jul. 18, 2017 in Patent Application No. 10-2017-7002104 (with English Translation).

* cited by examiner

600

| Pattern (5 bits) | FFT | GI | Dx | Dy |
|---|---|---|---|---|
| 0 | 8 | GI1_192 | 16 | 1 |
| 1 | 8 | GI2_384 | 8 | 1 |
| 2 | 8 | GI3_512 | 6 | 1 |
| 3 | 8 | GI4_768 | 4 | 1 |
| 4 | 8 | GI5_1024 | 3 | 1 |
| 5 | 8 | GI6_1536 | 4 | 1 |
| 6 | 8 | GI7_2048 | 3 | 1 |
| 7 | 16 | GI1_192 | 32 | 1 |
| 8 | 16 | GI2_384 | 16 | 1 |
| 9 | 16 | GI3_512 | 12 | 1 |
| 10 | 16 | GI4_768 | 8 | 1 |
| 11 | 16 | GI5_1024 | 6 | 1 |
| 12 | 16 | GI6_1536 | 4 | 1 |
| 13 | 16 | GI7_2048 | 3 | 1 |
| 14 | 16 | GI8_2432 | 3 | 1 |
| 15 | 16 | GI9_3072 | 4 | 1 |
| 16 | 16 | GI10_3648 | 4 | 1 |
| 17 | 16 | GI11_4096 | 3 | 1 |
| 18 | 32 | GI1_192 | 32 | 1 |
| 19 | 32 | GI2_384 | 32 | 1 |
| 20 | 32 | GI3_512 | 24 | 1 |
| 21 | 32 | GI4_768 | 16 | 1 |
| 22 | 32 | GI5_1024 | 12 | 1 |
| 23 | 32 | GI6_1536 | 8 | 1 |
| 24 | 32 | GI7_2048 | 6 | 1 |
| 25 | 32 | GI8_2432 | 6 | 1 |
| 26 | 32 | GI9_3072 | 8 | 1 |
| 27 | 32 | GI9_3072 | 3 | 1 |
| 28 | 32 | GI10_3648 | 8 | 1 |
| 29 | 32 | GI10_3648 | 3 | 1 |
| 30 | 32 | GI11_4096 | 3 | 1 |
| 31 | 32 | GI12_4864 | 3 | 1 |

602

| L1 Mode (3 bits) | |
|---|---|
| 0 | Reserved |
| 1 | MODE1 |
| 2 | MODE2 |
| 3 | MODE3 |
| 4 | MODE4 |
| 5 | MODE5 |
| 6 | MODE6 |
| 7 | MODE7 |

| Pattern (8 bits) | FFT | GI | Dx | Dy | LL Mode |
|---|---|---|---|---|---|
| 0 | 8 | GI1_192 | 16 | 1 | 1 |
| 1 | 8 | GI1_192 | 16 | 1 | 2 |
| 2 | 8 | GI1_192 | 16 | 1 | 3 |
| 3 | 8 | GI1_192 | 16 | 1 | 4 |
| 4 | 8 | GI1_192 | 16 | 1 | 5 |
| 5 | 8 | GI1_192 | 16 | 1 | 6 |
| 6 | 8 | GI1_192 | 16 | 1 | 7 |
| 7 | 8 | GI2_384 | 8 | 1 | 1 |
| 8 | 8 | GI2_384 | 8 | 1 | 2 |
| 9 | 8 | GI2_384 | 8 | 1 | 3 |
| 10 | 8 | GI2_384 | 8 | 1 | 4 |
| 11 | 8 | GI2_384 | 8 | 1 | 5 |
| 12 | 8 | GI2_384 | 8 | 1 | 6 |
| 13 | 8 | GI2_384 | 8 | 1 | 7 |
| 14 | 8 | GI3_512 | 6 | 1 | 1 |
| 15 | 8 | GI3_512 | 6 | 1 | 2 |
| 16 | 8 | GI3_512 | 6 | 1 | 3 |
| 17 | 8 | GI3_512 | 6 | 1 | 4 |
| 18 | 8 | GI3_512 | 6 | 1 | 5 |
| 19 | 8 | GI3_512 | 6 | 1 | 6 |
| 20 | 8 | GI3_512 | 6 | 1 | 7 |
| 21 | 8 | GI4_768 | 4 | 1 | 1 |
| 22 | 8 | GI4_768 | 4 | 1 | 2 |
| 23 | 8 | GI4_768 | 4 | 1 | 3 |
| 24 | 8 | GI4_768 | 4 | 1 | 4 |
| 25 | 8 | GI4_768 | 4 | 1 | 5 |
| 26 | 8 | GI4_768 | 4 | 1 | 6 |
| 27 | 8 | GI4_768 | 4 | 1 | 7 |
| 28 | 8 | GI5_1024 | 3 | 1 | 1 |
| 29 | 8 | GI5_1024 | 3 | 1 | 2 |
| 30 | 8 | GI5_1024 | 3 | 1 | 3 |
| 31 | 8 | GI5_1024 | 3 | 1 | 4 |
| 32 | 8 | GI5_1024 | 3 | 1 | 5 |
| 33 | 8 | GI5_1024 | 3 | 1 | 6 |
| 34 | 8 | GI5_1024 | 3 | 1 | 7 |
| 35 | 8 | GI6_1536 | 4 | 1 | 1 |
| 36 | 8 | GI6_1536 | 4 | 1 | 2 |
| 37 | 8 | GI6_1536 | 4 | 1 | 3 |
| 38 | 8 | GI6_1536 | 4 | 1 | 4 |
| 39 | 8 | GI6_1536 | 4 | 1 | 5 |
| 40 | 8 | GI6_1536 | 4 | 1 | 6 |
| 41 | 8 | GI6_1536 | 4 | 1 | 7 |
| 42 | 8 | GI7_2048 | 3 | 1 | 1 |

| Pattern (8 bits) | FFT | GI | Dx | Dy | LL Mode |
|---|---|---|---|---|---|
| 43 | 8 | GI7_2048 | 3 | 1 | 2 |
| 44 | 8 | GI7_2048 | 3 | 1 | 3 |
| 45 | 8 | GI7_2048 | 3 | 1 | 4 |
| 46 | 8 | GI7_2048 | 3 | 1 | 5 |
| 47 | 8 | GI7_2048 | 3 | 1 | 6 |
| 48 | 8 | GI7_2048 | 3 | 1 | 7 |
| 49 | 16 | GI1_192 | 32 | 1 | 1 |
| 50 | 16 | GI1_192 | 32 | 1 | 2 |
| 51 | 16 | GI1_192 | 32 | 1 | 3 |
| 52 | 16 | GI1_192 | 32 | 1 | 4 |
| 53 | 16 | GI1_192 | 32 | 1 | 5 |
| 54 | 16 | GI1_192 | 32 | 1 | 6 |
| 55 | 16 | GI1_192 | 32 | 1 | 7 |
| 56 | 16 | GI2_384 | 16 | 1 | 1 |
| 57 | 16 | GI2_384 | 16 | 1 | 2 |
| 58 | 16 | GI2_384 | 16 | 1 | 3 |
| 59 | 16 | GI2_384 | 16 | 1 | 4 |
| 60 | 16 | GI2_384 | 16 | 1 | 5 |
| 61 | 16 | GI2_384 | 16 | 1 | 6 |
| 62 | 16 | GI2_384 | 16 | 1 | 7 |
| 63 | 16 | GI3_512 | 12 | 1 | 1 |
| 64 | 16 | GI3_512 | 12 | 1 | 2 |
| 65 | 16 | GI3_512 | 12 | 1 | 3 |
| 66 | 16 | GI3_512 | 12 | 1 | 4 |
| 67 | 16 | GI3_512 | 12 | 1 | 5 |
| 68 | 16 | GI3_512 | 12 | 1 | 6 |
| 69 | 16 | GI3_512 | 12 | 1 | 7 |
| 70 | 16 | GI4_768 | 8 | 1 | 1 |
| 71 | 16 | GI4_768 | 8 | 1 | 2 |
| 72 | 16 | GI4_768 | 8 | 1 | 3 |
| 73 | 16 | GI4_768 | 8 | 1 | 4 |
| 74 | 16 | GI4_768 | 8 | 1 | 5 |
| 75 | 16 | GI4_768 | 8 | 1 | 6 |
| 76 | 16 | GI4_768 | 8 | 1 | 7 |
| 77 | 16 | GI5_1024 | 6 | 1 | 1 |
| 78 | 16 | GI5_1024 | 6 | 1 | 2 |
| 79 | 16 | GI5_1024 | 6 | 1 | 3 |
| 80 | 16 | GI5_1024 | 6 | 1 | 4 |
| 81 | 16 | GI5_1024 | 6 | 1 | 5 |
| 82 | 16 | GI5_1024 | 6 | 1 | 6 |
| 83 | 16 | GI5_1024 | 6 | 1 | 7 |
| 84 | 16 | GI6_1536 | 4 | 1 | 1 |
| 85 | 16 | GI6_1536 | 4 | 1 | 2 |

| Pattern (8 bits) | FFT | GI | Dx | Dy | LL Mode |
|---|---|---|---|---|---|
| 86 | 16 | GI6_1536 | 4 | 1 | 3 |
| 87 | 16 | GI6_1536 | 4 | 1 | 4 |
| 88 | 16 | GI6_1536 | 4 | 1 | 5 |
| 89 | 16 | GI6_1536 | 4 | 1 | 6 |
| 90 | 16 | GI6_1536 | 4 | 1 | 7 |
| 91 | 16 | GI7_2048 | 3 | 1 | 1 |
| 92 | 16 | GI7_2048 | 3 | 1 | 2 |
| 93 | 16 | GI7_2048 | 3 | 1 | 3 |
| 94 | 16 | GI7_2048 | 3 | 1 | 4 |
| 95 | 16 | GI7_2048 | 3 | 1 | 5 |
| 96 | 16 | GI7_2048 | 3 | 1 | 6 |
| 97 | 16 | GI7_2048 | 3 | 1 | 7 |
| 98 | 16 | GI8_2432 | 3 | 1 | 1 |
| 99 | 16 | GI8_2432 | 3 | 1 | 2 |
| 100 | 16 | GI8_2432 | 3 | 1 | 3 |
| 101 | 16 | GI8_2432 | 3 | 1 | 4 |
| 102 | 16 | GI8_2432 | 3 | 1 | 5 |
| 103 | 16 | GI8_2432 | 3 | 1 | 6 |
| 104 | 16 | GI8_2432 | 3 | 1 | 7 |
| 105 | 16 | GI9_3072 | 4 | 1 | 1 |
| 106 | 16 | GI9_3072 | 4 | 1 | 2 |
| 107 | 16 | GI9_3072 | 4 | 1 | 3 |
| 108 | 16 | GI9_3072 | 4 | 1 | 4 |
| 109 | 16 | GI9_3072 | 4 | 1 | 5 |
| 110 | 16 | GI9_3072 | 4 | 1 | 6 |
| 111 | 16 | GI9_3072 | 4 | 1 | 7 |
| 112 | 16 | GI10_3648 | 4 | 1 | 1 |
| 113 | 16 | GI10_3648 | 4 | 1 | 2 |
| 114 | 16 | GI10_3648 | 4 | 1 | 3 |
| 115 | 16 | GI10_3648 | 4 | 1 | 4 |
| 116 | 16 | GI10_3648 | 4 | 1 | 5 |
| 117 | 16 | GI10_3648 | 4 | 1 | 6 |
| 118 | 16 | GI10_3648 | 4 | 1 | 7 |
| 119 | 16 | GI11_4096 | 3 | 1 | 1 |
| 120 | 16 | GI11_4096 | 3 | 1 | 2 |
| 121 | 16 | GI11_4096 | 3 | 1 | 3 |
| 122 | 16 | GI11_4096 | 3 | 1 | 4 |
| 123 | 16 | GI11_4096 | 3 | 1 | 5 |
| 124 | 16 | GI11_4096 | 3 | 1 | 6 |
| 125 | 16 | GI11_4096 | 3 | 1 | 7 |
| 126 | 32 | GI1_192 | 32 | 1 | 1 |
| 127 | 32 | GI1_192 | 32 | 1 | 2 |
| 128 | 32 | GI1_192 | 32 | 1 | 3 |

| Pattern (8 bits) | FFT | GI | Dx | Dy | LI Mode |
|---|---|---|---|---|---|
| 129 | 32 | GI1_192 | 32 | 1 | 4 |
| 130 | 32 | GI1_192 | 32 | 1 | 5 |
| 131 | 32 | GI1_192 | 32 | 1 | 6 |
| 132 | 32 | GI1_192 | 32 | 1 | 7 |
| 133 | 32 | GI2_384 | 32 | 1 | 1 |
| 134 | 32 | GI2_384 | 32 | 1 | 2 |
| 135 | 32 | GI2_384 | 32 | 1 | 3 |
| 136 | 32 | GI2_384 | 32 | 1 | 4 |
| 137 | 32 | GI2_384 | 32 | 1 | 5 |
| 138 | 32 | GI2_384 | 32 | 1 | 6 |
| 139 | 32 | GI2_384 | 32 | 1 | 7 |
| 140 | 32 | GI3_512 | 24 | 1 | 1 |
| 141 | 32 | GI3_512 | 24 | 1 | 2 |
| 142 | 32 | GI3_512 | 24 | 1 | 3 |
| 143 | 32 | GI3_512 | 24 | 1 | 4 |
| 144 | 32 | GI3_512 | 24 | 1 | 5 |
| 145 | 32 | GI3_512 | 24 | 1 | 6 |
| 146 | 32 | GI3_512 | 24 | 1 | 7 |
| 147 | 32 | GI4_768 | 16 | 1 | 1 |
| 148 | 32 | GI4_768 | 16 | 1 | 2 |
| 149 | 32 | GI4_768 | 16 | 1 | 3 |
| 150 | 32 | GI4_768 | 16 | 1 | 4 |
| 151 | 32 | GI4_768 | 16 | 1 | 5 |
| 152 | 32 | GI4_768 | 16 | 1 | 6 |
| 153 | 32 | GI4_768 | 16 | 1 | 7 |
| 154 | 32 | GI5_1024 | 12 | 1 | 1 |
| 155 | 32 | GI5_1024 | 12 | 1 | 2 |
| 156 | 32 | GI5_1024 | 12 | 1 | 3 |
| 157 | 32 | GI5_1024 | 12 | 1 | 4 |
| 158 | 32 | GI5_1024 | 12 | 1 | 5 |
| 159 | 32 | GI5_1024 | 12 | 1 | 6 |
| 160 | 32 | GI5_1024 | 12 | 1 | 7 |
| 161 | 32 | GI6_1536 | 8 | 1 | 1 |
| 162 | 32 | GI6_1536 | 8 | 1 | 2 |
| 163 | 32 | GI6_1536 | 8 | 1 | 3 |
| 164 | 32 | GI6_1536 | 8 | 1 | 4 |
| 165 | 32 | GI6_1536 | 8 | 1 | 5 |
| 166 | 32 | GI6_1536 | 8 | 1 | 6 |
| 167 | 32 | GI6_1536 | 8 | 1 | 7 |
| 168 | 32 | GI7_2048 | 6 | 1 | 1 |
| 169 | 32 | GI7_2048 | 6 | 1 | 2 |
| 170 | 32 | GI7_2048 | 6 | 1 | 3 |
| 171 | 32 | GI7_2048 | 6 | 1 | 4 |

| Pattern (8 bits) | FFT | GI | Dx | Dy | LI Mode |
|---|---|---|---|---|---|
| 172 | 32 | GI7_3848 | 6 | 1 | 5 |
| 173 | 32 | GI7_3848 | 6 | 1 | 6 |
| 174 | 32 | GI7_3848 | 6 | 1 | 7 |
| 175 | 32 | GI8_2432 | 6 | 1 | 1 |
| 176 | 32 | GI8_2432 | 6 | 1 | 2 |
| 177 | 32 | GI8_2432 | 6 | 1 | 3 |
| 178 | 32 | GI8_2432 | 6 | 1 | 4 |
| 179 | 32 | GI8_2432 | 6 | 1 | 5 |
| 180 | 32 | GI8_2432 | 6 | 1 | 6 |
| 181 | 32 | GI8_2432 | 6 | 1 | 7 |
| 182 | 32 | GI9_3072 | 8 | 1 | 1 |
| 183 | 32 | GI9_3072 | 8 | 1 | 2 |
| 184 | 32 | GI9_3072 | 8 | 1 | 3 |
| 185 | 32 | GI9_3072 | 8 | 1 | 4 |
| 186 | 32 | GI9_3072 | 8 | 1 | 5 |
| 187 | 32 | GI9_3072 | 8 | 1 | 6 |
| 188 | 32 | GI9_3072 | 8 | 1 | 7 |
| 189 | 32 | GI9_3072 | 3 | 1 | 1 |
| 190 | 32 | GI9_3072 | 3 | 1 | 2 |
| 191 | 32 | GI9_3072 | 3 | 1 | 3 |
| 192 | 32 | GI9_3072 | 3 | 1 | 4 |
| 193 | 32 | GI9_3072 | 3 | 1 | 5 |
| 194 | 32 | GI9_3072 | 3 | 1 | 6 |
| 195 | 32 | GI9_3072 | 3 | 1 | 7 |
| 196 | 32 | GI10_3648 | 8 | 1 | 1 |
| 197 | 32 | GI10_3648 | 8 | 1 | 2 |
| 198 | 32 | GI10_3648 | 8 | 1 | 3 |
| 199 | 32 | GI10_3648 | 8 | 1 | 4 |
| 200 | 32 | GI10_3648 | 8 | 1 | 5 |
| 201 | 32 | GI10_3648 | 8 | 1 | 6 |
| 202 | 32 | GI10_3648 | 8 | 1 | 7 |
| 203 | 32 | GI10_3648 | 3 | 1 | 1 |
| 204 | 32 | GI10_3648 | 3 | 1 | 2 |
| 205 | 32 | GI10_3648 | 3 | 1 | 3 |
| 206 | 32 | GI10_3648 | 3 | 1 | 4 |
| 207 | 32 | GI10_3648 | 3 | 1 | 5 |
| 208 | 32 | GI10_3648 | 3 | 1 | 6 |
| 209 | 32 | GI10_3648 | 3 | 1 | 7 |
| 210 | 32 | GI11_4096 | 3 | 1 | 1 |
| 211 | 32 | GI11_4096 | 3 | 1 | 2 |
| 212 | 32 | GI11_4096 | 3 | 1 | 3 |
| 213 | 32 | GI11_4096 | 3 | 1 | 4 |
| 214 | 32 | GI11_4096 | 3 | 1 | 5 |

| Pattern (8 bits) | FFT | GI | Dx | Dy | L1 Mode |
|---|---|---|---|---|---|
| 215 | 32 | GI11_4096 | 3 | 1 | 6 |
| 216 | 32 | GI11_4096 | 3 | 1 | 7 |
| 217 | 32 | GI12_4864 | 3 | 1 | 1 |
| 218 | 32 | GI12_4864 | 3 | 1 | 2 |
| 219 | 32 | GI12_4864 | 3 | 1 | 3 |
| 220 | 32 | GI12_4864 | 3 | 1 | 4 |
| 221 | 32 | GI12_4864 | 3 | 1 | 5 |
| 222 | 32 | GI12_4864 | 3 | 1 | 6 |
| 223 | 32 | GI12_4864 | 3 | 1 | 7 |
| 224 | Reserved | | | | |
| 225 | Reserved | | | | |
| 226 | Reserved | | | | |
| 227 | Reserved | | | | |
| 228 | Reserved | | | | |
| 229 | Reserved | | | | |
| 230 | Reserved | | | | |
| 231 | Reserved | | | | |
| 232 | Reserved | | | | |
| 233 | Reserved | | | | |
| 234 | Reserved | | | | |
| 235 | Reserved | | | | |
| 236 | Reserved | | | | |
| 237 | Reserved | | | | |
| 238 | Reserved | | | | |
| 239 | Reserved | | | | |
| 240 | Reserved | | | | |
| 241 | Reserved | | | | |
| 242 | Reserved | | | | |
| 243 | Reserved | | | | |
| 244 | Reserved | | | | |
| 245 | Reserved | | | | |
| 246 | Reserved | | | | |
| 247 | Reserved | | | | |
| 248 | Reserved | | | | |
| 249 | Reserved | | | | |
| 250 | Reserved | | | | |
| 251 | Reserved | | | | |
| 252 | Reserved | | | | |
| 253 | Reserved | | | | |
| 254 | Reserved | | | | |
| 255 | Reserved | | | | |

| Pattern (5 bits) | FFT | GI | Dx | Dy |
|---|---|---|---|---|
| 0 | 8 | GI1_192 | 16 | 1 |
| 1 | 8 | GI2_384 | 8 | 1 |
| 2 | 8 | GI3_512 | 6 | 1 |
| 3 | 8 | GI4_768 | 4 | 1 |
| 4 | 8 | GI5_1024 | 3 | 1 |
| 5 | 8 | GI6_1536 | 4 | 1 |
| 6 | 8 | GI7_2048 | 3 | 1 |
| 7 | 16 | GI1_192 | 32 | 1 |
| 8 | 16 | GI2_384 | 16 | 1 |
| 9 | 16 | GI3_512 | 12 | 1 |
| 10 | 16 | GI4_768 | 8 | 1 |
| 11 | 16 | GI5_1024 | 6 | 1 |
| 12 | 16 | GI6_1536 | 4 | 1 |
| 13 | 16 | GI7_2048 | 3 | 1 |
| 14 | 16 | GI8_2432 | 3 | 1 |
| 15 | 16 | GI9_3072 | 4 | 1 |
| 16 | 16 | GI_3648 | 4 | 1 |
| 17 | 16 | GI11_4096 | 3 | 1 |
| 18 | 32 | GI1_192 | 32 | 1 |
| 19 | 32 | GI2_384 | 32 | 1 |
| 20 | 32 | GI3_512 | 24 | 1 |
| 21 | 32 | GI4_768 | 16 | 1 |
| 22 | 32 | GI5_1024 | 12 | 1 |
| 23 | 32 | GI6_1536 | 8 | 1 |
| 24 | 32 | GI7_2048 | 6 | 1 |
| 25 | 32 | GI8_2432 | 6 | 1 |
| 26 | 32 | GI9_3072 | 8 | 1 |
| 27 | 32 | GI9_3072 | 3 | 1 |
| 28 | 32 | GI10_3648 | 8 | 1 |
| 29 | 32 | GI10_3648 | 3 | 1 |
| 30 | 32 | GI11_4096 | 3 | 1 |
| 31 | 32 | GI12_4864 | 3 | 1 |

802

| L1 Mode (2 bits) | |
|---|---|
| 0 | MODE1 |
| 1 | MODE2 |
| 2 | MODE3 |
| 3 | MODE4 |

| Pattern (7 bits) | FFT | GI | Dx | Dy | LI Mode |
|---|---|---|---|---|---|
| 0 | 8 | GI1_192 | 16 | 1 | 1 |
| 1 | 8 | GI1_192 | 16 | 1 | 2 |
| 2 | 8 | GI1_192 | 16 | 1 | 3 |
| 3 | 8 | GI1_192 | 16 | 1 | 4 |
| 4 | 8 | GI2_384 | 8 | 1 | 1 |
| 5 | 8 | GI2_384 | 8 | 1 | 2 |
| 6 | 8 | GI2_384 | 8 | 1 | 3 |
| 7 | 8 | GI2_384 | 8 | 1 | 4 |
| 8 | 8 | GI3_512 | 6 | 1 | 1 |
| 9 | 8 | GI3_512 | 6 | 1 | 2 |
| 10 | 8 | GI3_512 | 6 | 1 | 3 |
| 11 | 8 | GI3_512 | 6 | 1 | 4 |
| 12 | 8 | GI4_768 | 4 | 1 | 1 |
| 13 | 8 | GI4_768 | 4 | 1 | 2 |
| 14 | 8 | GI4_768 | 4 | 1 | 3 |
| 15 | 8 | GI4_768 | 4 | 1 | 4 |
| 16 | 8 | GI5_1024 | 3 | 1 | 1 |
| 17 | 8 | GI5_1024 | 3 | 1 | 2 |
| 18 | 8 | GI5_1024 | 3 | 1 | 3 |
| 19 | 8 | GI5_1024 | 3 | 1 | 4 |
| 20 | 8 | GI6_1536 | 4 | 1 | 1 |
| 21 | 8 | GI6_1536 | 4 | 1 | 2 |
| 22 | 8 | GI6_1536 | 4 | 1 | 3 |
| 23 | 8 | GI6_1536 | 4 | 1 | 4 |
| 24 | 8 | GI7_2048 | 3 | 1 | 1 |
| 25 | 8 | GI7_2048 | 3 | 1 | 2 |
| 26 | 8 | GI7_2048 | 3 | 1 | 3 |
| 27 | 8 | GI7_2048 | 3 | 1 | 4 |
| 28 | 16 | GI1_192 | 32 | 1 | 1 |
| 29 | 16 | GI1_192 | 32 | 1 | 2 |
| 30 | 16 | GI1_192 | 32 | 1 | 3 |
| 31 | 16 | GI1_192 | 32 | 1 | 4 |
| 32 | 16 | GI2_384 | 16 | 1 | 1 |
| 33 | 16 | GI2_384 | 16 | 1 | 2 |
| 34 | 16 | GI2_384 | 16 | 1 | 3 |
| 35 | 16 | GI2_384 | 16 | 1 | 4 |
| 36 | 16 | GI3_512 | 12 | 1 | 1 |
| 37 | 16 | GI3_512 | 12 | 1 | 2 |
| 38 | 16 | GI3_512 | 12 | 1 | 3 |
| 39 | 16 | GI3_512 | 12 | 1 | 4 |
| 40 | 16 | GI4_768 | 8 | 1 | 1 |
| 41 | 16 | GI4_768 | 8 | 1 | 2 |
| 42 | 16 | GI4_768 | 8 | 1 | 3 |
| 43 | 16 | GI4_768 | 8 | 1 | 4 |
| 44 | 16 | GI5_1024 | 6 | 1 | 1 |
| 45 | 16 | GI5_1024 | 6 | 1 | 2 |
| 46 | 16 | GI5_1024 | 6 | 1 | 3 |

| Pattern (7 bits) | FFT | GI | Dx | Dy | L1 Mode |
|---|---|---|---|---|---|
| 47 | 16 | GI5 1024 | 6 | 1 | 4 |
| 48 | 16 | GI6 1536 | 4 | 1 | 1 |
| 49 | 16 | GI6 1536 | 4 | 1 | 2 |
| 50 | 16 | GI6 1536 | 4 | 1 | 3 |
| 51 | 16 | GI6 1536 | 4 | 1 | 4 |
| 52 | 16 | GI7 2048 | 3 | 1 | 1 |
| 53 | 16 | GI7 2048 | 3 | 1 | 2 |
| 54 | 16 | GI7 2048 | 3 | 1 | 3 |
| 55 | 16 | GI7 2048 | 3 | 1 | 4 |
| 56 | 16 | GI8 2432 | 3 | 1 | 1 |
| 57 | 16 | GI8 2432 | 3 | 1 | 2 |
| 58 | 16 | GI8 2432 | 3 | 1 | 3 |
| 59 | 16 | GI8 2432 | 3 | 1 | 4 |
| 60 | 16 | GI9 3072 | 4 | 1 | 1 |
| 61 | 16 | GI9 3072 | 4 | 1 | 2 |
| 62 | 16 | GI9 3072 | 4 | 1 | 3 |
| 63 | 16 | GI9 3072 | 4 | 1 | 4 |
| 64 | 16 | GI10 3648 | 4 | 1 | 1 |
| 65 | 16 | GI10 3648 | 4 | 1 | 2 |
| 66 | 16 | GI10 3648 | 4 | 1 | 3 |
| 67 | 16 | GI10 3648 | 4 | 1 | 4 |
| 68 | 16 | GI11 4096 | 3 | 1 | 1 |
| 69 | 16 | GI11 4096 | 3 | 1 | 2 |
| 70 | 16 | GI11 4096 | 3 | 1 | 3 |
| 71 | 16 | GI11 4096 | 3 | 1 | 4 |
| 72 | 32 | GI1 192 | 32 | 1 | 1 |
| 73 | 32 | GI1 192 | 32 | 1 | 2 |
| 74 | 32 | GI1 192 | 32 | 1 | 3 |
| 75 | 32 | GI1 192 | 32 | 1 | 4 |
| 76 | 32 | GI2 384 | 32 | 1 | 1 |
| 77 | 32 | GI2 384 | 32 | 1 | 2 |
| 78 | 32 | GI2 384 | 32 | 1 | 3 |
| 79 | 32 | GI2 384 | 32 | 1 | 4 |
| 80 | 32 | GI3 512 | 24 | 1 | 1 |
| 81 | 32 | GI3 512 | 24 | 1 | 2 |
| 82 | 32 | GI3 512 | 24 | 1 | 3 |
| 83 | 32 | GI3 512 | 24 | 1 | 4 |
| 84 | 32 | GI4 768 | 16 | 1 | 1 |
| 85 | 32 | GI4 768 | 16 | 1 | 2 |
| 86 | 32 | GI4 768 | 16 | 1 | 3 |
| 87 | 32 | GI4 768 | 16 | 1 | 4 |
| 88 | 32 | GI5 1024 | 12 | 1 | 1 |
| 89 | 32 | GI5 1024 | 12 | 1 | 2 |
| 90 | 32 | GI5 1024 | 12 | 1 | 3 |
| 91 | 32 | GI5 1024 | 12 | 1 | 4 |
| 92 | 32 | GI6 1536 | 8 | 1 | 1 |
| 93 | 32 | GI6 1536 | 8 | 1 | 2 |
| 94 | 32 | GI6 1536 | 8 | 1 | 3 |

| Pattern (7 bits) | FFT | GI | Dx | Dy | LI Mode |
|---|---|---|---|---|---|
| 95 | 32 | GI6_1536 | 8 | 1 | 4 |
| 96 | 32 | GI7_2048 | 6 | 1 | 1 |
| 97 | 32 | GI7_2048 | 6 | 1 | 2 |
| 98 | 32 | GI7_2048 | 6 | 1 | 3 |
| 99 | 32 | GI7_2048 | 6 | 1 | 4 |
| 100 | 32 | GI8_2432 | 6 | 1 | 1 |
| 101 | 32 | GI8_2432 | 6 | 1 | 2 |
| 102 | 32 | GI8_2432 | 6 | 1 | 3 |
| 103 | 32 | GI8_2432 | 6 | 1 | 4 |
| 104 | 32 | GI9_3072 | 8 | 1 | 1 |
| 105 | 32 | GI9_3072 | 8 | 1 | 2 |
| 106 | 32 | GI9_3072 | 8 | 1 | 3 |
| 107 | 32 | GI9_3072 | 8 | 1 | 4 |
| 108 | 32 | GI9_3072 | 3 | 1 | 1 |
| 109 | 32 | GI9_3072 | 3 | 1 | 2 |
| 110 | 32 | GI9_3072 | 3 | 1 | 3 |
| 111 | 32 | GI9_3072 | 3 | 1 | 4 |
| 112 | 32 | GI10_3648 | 8 | 1 | 1 |
| 113 | 32 | GI10_3648 | 8 | 1 | 2 |
| 114 | 32 | GI10_3648 | 8 | 1 | 3 |
| 115 | 32 | GI10_3648 | 8 | 1 | 4 |
| 116 | 32 | GI10_3648 | 3 | 1 | 1 |
| 117 | 32 | GI10_3648 | 3 | 1 | 2 |
| 118 | 32 | GI10_3648 | 3 | 1 | 3 |
| 119 | 32 | GI10_3648 | 3 | 1 | 4 |
| 120 | 32 | GI11_4096 | 3 | 1 | 1 |
| 121 | 32 | GI11_4096 | 3 | 1 | 2 |
| 122 | 32 | GI11_4096 | 3 | 1 | 3 |
| 123 | 32 | GI11_4096 | 3 | 1 | 4 |
| 124 | 32 | GI12_4864 | 3 | 1 | 1 |
| 125 | 32 | GI12_4864 | 3 | 1 | 2 |
| 126 | 32 | GI12_4864 | 3 | 1 | 3 |
| 127 | 32 | GI12_4864 | 3 | 1 | 4 |

| Pattern (4 bits) | FFT | GI | Dx | Dy |
|---|---|---|---|---|
| 0 | 8 | GI3_512 | 6 | 1 |
| 1 | 8 | GI5_1024 | 3 | 1 |
| 2 | 8 | GI7_2048 | 1 | 1 |
| 3 | 16 | GI1_192 | 32 | 1 |
| 4 | 16 | GI3_512 | 12 | 1 |
| 5 | 16 | GI5_1024 | 8 | 1 |
| 6 | 16 | GI7_2048 | 3 | 1 |
| 7 | 16 | GI8_3072 | 4 | 1 |
| 8 | 16 | GI11_4096 | 3 | 1 |
| 9 | 32 | GI1_192 | 32 | 1 |
| 10 | 32 | GI2_384 | 32 | 1 |
| 11 | 32 | GI4_768 | 16 | 1 |
| 12 | 32 | GI6_1536 | 8 | 1 |
| 13 | 32 | GI8_2432 | 6 | 1 |
| 14 | 32 | GI10_3648 | 8 | 1 |
| 15 | 32 | GI12_4864 | 3 | 1 |

1002

| L1 Mode (3 bits) | |
|---|---|
| 0 | Reserved |
| 1 | MODE1 |
| 2 | MODE2 |
| 3 | MODE3 |
| 4 | MODE4 |
| 5 | MODE5 |
| 6 | MODE6 |
| 7 | MODE7 |

| Pattern (7 bits) | FFT | GI | Dx | Dy | L1 Mode |
|---|---|---|---|---|---|
| 0 | 8 | GI3_512 | 6 | 1 | 1 |
| 1 | 8 | GI3_512 | 6 | 1 | 2 |
| 2 | 8 | GI3_512 | 6 | 1 | 3 |
| 3 | 8 | GI3_512 | 6 | 1 | 4 |
| 4 | 8 | GI3_512 | 6 | 1 | 5 |
| 5 | 8 | GI3_512 | 6 | 1 | 6 |
| 6 | 8 | GI3_512 | 6 | 1 | 7 |
| 7 | 8 | GI5_1024 | 3 | 1 | 1 |
| 8 | 8 | GI5_1024 | 3 | 1 | 2 |
| 9 | 8 | GI5_1024 | 3 | 1 | 3 |
| 10 | 8 | GI5_1024 | 3 | 1 | 4 |
| 11 | 8 | GI5_1024 | 3 | 1 | 5 |
| 12 | 8 | GI5_1024 | 3 | 1 | 6 |
| 13 | 8 | GI5_1024 | 3 | 1 | 7 |
| 14 | 8 | GI7_2048 | 3 | 1 | 1 |
| 15 | 8 | GI7_2048 | 3 | 1 | 2 |
| 16 | 8 | GI7_2048 | 3 | 1 | 3 |
| 17 | 8 | GI7_2048 | 3 | 1 | 4 |
| 18 | 8 | GI7_2048 | 3 | 1 | 5 |
| 19 | 8 | GI7_2048 | 3 | 1 | 6 |
| 20 | 8 | GI7_2048 | 3 | 1 | 7 |
| 21 | 16 | GI1_192 | 32 | 1 | 1 |
| 22 | 16 | GI1_192 | 32 | 1 | 2 |
| 23 | 16 | GI1_192 | 32 | 1 | 3 |
| 24 | 16 | GI1_192 | 32 | 1 | 4 |
| 25 | 16 | GI1_192 | 32 | 1 | 5 |
| 26 | 16 | GI1_192 | 32 | 1 | 6 |
| 27 | 16 | GI1_192 | 32 | 1 | 7 |
| 28 | 16 | GI3_512 | 12 | 1 | 1 |
| 29 | 16 | GI3_512 | 12 | 1 | 2 |
| 30 | 16 | GI3_512 | 12 | 1 | 3 |
| 31 | 16 | GI3_512 | 12 | 1 | 4 |
| 32 | 16 | GI3_512 | 12 | 1 | 5 |
| 33 | 16 | GI3_512 | 12 | 1 | 6 |
| 34 | 16 | GI3_512 | 12 | 1 | 7 |
| 35 | 16 | GI5_1024 | 6 | 1 | 1 |
| 36 | 16 | GI5_1024 | 6 | 1 | 2 |
| 37 | 16 | GI5_1024 | 6 | 1 | 3 |
| 38 | 16 | GI5_1024 | 6 | 1 | 4 |
| 39 | 16 | GI5_1024 | 6 | 1 | 5 |
| 40 | 16 | GI5_1024 | 6 | 1 | 6 |
| 41 | 16 | GI5_1024 | 6 | 1 | 7 |
| 42 | 16 | GI7_2048 | 3 | 1 | 1 |
| 43 | 16 | GI7_2048 | 3 | 1 | 2 |
| 44 | 16 | GI7_2048 | 3 | 1 | 3 |
| 45 | 16 | GI7_2048 | 3 | 1 | 4 |

| Pattern (7 bits) | FFT | GI | Dx | Dy | LI Mode |
|---|---|---|---|---|---|
| 46 | 16 | GI7 3048 | 3 | 1 | 5 |
| 47 | 16 | GI7 3048 | 3 | 1 | 6 |
| 48 | 16 | GI7 3048 | 3 | 1 | 7 |
| 49 | 16 | GI9 3072 | 4 | 1 | 1 |
| 50 | 16 | GI9 3072 | 4 | 1 | 2 |
| 51 | 16 | GI9 3072 | 4 | 1 | 3 |
| 52 | 16 | GI9 3072 | 4 | 1 | 4 |
| 53 | 16 | GI9 3072 | 4 | 1 | 5 |
| 54 | 16 | GI9 3072 | 4 | 1 | 6 |
| 55 | 16 | GI9 3072 | 4 | 1 | 7 |
| 56 | 16 | GI11 4096 | 3 | 1 | 1 |
| 57 | 16 | GI11 4096 | 3 | 1 | 2 |
| 58 | 16 | GI11 4096 | 3 | 1 | 3 |
| 59 | 16 | GI11 4096 | 3 | 1 | 4 |
| 60 | 16 | GI11 4096 | 3 | 1 | 5 |
| 61 | 16 | GI11 4096 | 3 | 1 | 6 |
| 62 | 16 | GI11 4096 | 3 | 1 | 7 |
| 63 | 32 | GI1 192 | 32 | 1 | 1 |
| 64 | 32 | GI1 192 | 32 | 1 | 2 |
| 65 | 32 | GI1 192 | 32 | 1 | 3 |
| 66 | 32 | GI1 192 | 32 | 1 | 4 |
| 67 | 32 | GI1 192 | 32 | 1 | 5 |
| 68 | 32 | GI1 192 | 32 | 1 | 6 |
| 69 | 32 | GI1 192 | 32 | 1 | 7 |
| 70 | 32 | GI2 384 | 32 | 1 | 1 |
| 71 | 32 | GI2 384 | 32 | 1 | 2 |
| 72 | 32 | GI2 384 | 32 | 1 | 3 |
| 73 | 32 | GI2 384 | 32 | 1 | 4 |
| 74 | 32 | GI2 384 | 32 | 1 | 5 |
| 75 | 32 | GI2 384 | 32 | 1 | 6 |
| 76 | 32 | GI2 384 | 32 | 1 | 7 |
| 77 | 32 | GI4 768 | 16 | 1 | 1 |
| 78 | 32 | GI4 768 | 16 | 1 | 2 |
| 79 | 32 | GI4 768 | 16 | 1 | 3 |
| 80 | 32 | GI4 768 | 16 | 1 | 4 |
| 81 | 32 | GI4 768 | 16 | 1 | 5 |
| 82 | 32 | GI4 768 | 16 | 1 | 6 |
| 83 | 32 | GI4 768 | 16 | 1 | 7 |
| 84 | 32 | GI6 1536 | 8 | 1 | 1 |
| 85 | 32 | GI6 1536 | 8 | 1 | 2 |
| 86 | 32 | GI6 1536 | 8 | 1 | 3 |
| 87 | 32 | GI6 1536 | 8 | 1 | 4 |
| 88 | 32 | GI6 1536 | 8 | 1 | 5 |
| 89 | 32 | GI6 1536 | 8 | 1 | 6 |
| 90 | 32 | GI6 1536 | 8 | 1 | 7 |
| 91 | 32 | GI8 2432 | 6 | 1 | 1 |
| 92 | 32 | GI8 2432 | 6 | 1 | 2 |
| 93 | 32 | GI8 2432 | 6 | 1 | 3 |

| Pattern (7 bits) | FFT | GI | Dx | Dy | LI Mode |
|---|---|---|---|---|---|
| 94 | 32 | GI8_2432 | 6 | 1 | 4 |
| 95 | 32 | GI8_2432 | 6 | 1 | 5 |
| 96 | 32 | GI8_2432 | 6 | 1 | 6 |
| 97 | 32 | GI8_2432 | 6 | 1 | 7 |
| 98 | 32 | GI10_3648 | 8 | 1 | 1 |
| 99 | 32 | GI10_3648 | 8 | 1 | 2 |
| 100 | 32 | GI10_3648 | 8 | 1 | 3 |
| 101 | 32 | GI10_3648 | 8 | 1 | 4 |
| 102 | 32 | GI10_3648 | 8 | 1 | 5 |
| 103 | 32 | GI10_3648 | 8 | 1 | 6 |
| 104 | 32 | GI10_3648 | 8 | 1 | 7 |
| 105 | 32 | GI10_3648 | 3 | 1 | 1 |
| 106 | 32 | GI10_3648 | 3 | 1 | 2 |
| 107 | 32 | GI10_3648 | 3 | 1 | 3 |
| 108 | 32 | GI10_3648 | 3 | 1 | 4 |
| 109 | 32 | GI10_3648 | 3 | 1 | 5 |
| 110 | 32 | GI10_3648 | 3 | 1 | 6 |
| 111 | 32 | GI10_3648 | 3 | 1 | 7 |
| 112 | 32 | GI12_4864 | 3 | 1 | 1 |
| 113 | 32 | GI12_4864 | 3 | 1 | 2 |
| 114 | 32 | GI12_4864 | 3 | 1 | 3 |
| 115 | 32 | GI12_4864 | 3 | 1 | 4 |
| 116 | 32 | GI12_4864 | 3 | 1 | 5 |
| 117 | 32 | GI12_4864 | 3 | 1 | 6 |
| 118 | 32 | GI12_4864 | 3 | 1 | 7 |
| 119 | Reserved | | | | |
| 120 | Reserved | | | | |
| 121 | Reserved | | | | |
| 122 | Reserved | | | | |
| 123 | Reserved | | | | |
| 124 | Reserved | | | | |
| 125 | Reserved | | | | |
| 126 | Reserved | | | | |
| 127 | Reserved | | | | |

| Pattern (8 bits) | FFT | GI | Dx | Dy |
|---|---|---|---|---|
| 0 | 8 | GI1_192 | 16 | 1 |
| 1 | 8 | GI2_384 | 8 | 1 |
| 2 | 8 | GI3_512 | 6 | 1 |
| 3 | 8 | GI4_768 | 4 | 1 |
| 4 | 8 | GI5_1024 | 3 | 1 |
| 5 | 8 | GI6_1536 | 4 | 1 |
| 6 | 8 | GI7_2048 | 3 | 1 |
| 7 | 16 | GI1_192 | 32 | 1 |
| 8 | 16 | GI2_384 | 16 | 1 |
| 9 | 16 | GI3_512 | 12 | 1 |
| 10 | 16 | GI4_768 | 8 | 1 |
| 11 | 16 | GI5_1024 | 6 | 1 |
| 12 | 16 | GI6_1536 | 4 | 1 |
| 13 | 16 | GI7_2048 | 3 | 1 |
| 14 | 16 | GI8_2352 | 3 | 1 |
| 15 | 16 | GI9_3072 | 4 | 1 |
| 16 | 16 | GI_3648 | 4 | 1 |
| 17 | 16 | GI11_4096 | 3 | 1 |
| 18 | 32 | - | 32 | 1 |
| 19 | 32 | - | 24 | 1 |
| 20 | 32 | - | 16 | 1 |
| 21 | 32 | - | 12 | 1 |
| 22 | 32 | - | 8 | 1 |
| 23 | 32 | - | 6 | 1 |
| 24 | 32 | - | 3 | 1 |
| 25 | Reserved | | | |
| 26 | Reserved | | | |
| 27 | Reserved | | | |
| 28 | Reserved | | | |
| 29 | Reserved | | | |
| 30 | Reserved | | | |
| 31 | Reserved | | | |

1202

| | LI Mode (3 bits) |
|---|---|
| 0 | Reserved |
| 1 | MODE1 |
| 2 | MODE2 |
| 3 | MODE3 |
| 4 | MODE4 |
| 5 | MODE5 |
| 6 | MODE6 |
| 7 | MODE7 |

| Pattern (8 bits) | FFT | GI | Dx | Dy | L1 Mode |
|---|---|---|---|---|---|
| 0 | 8 | GI1_192 | 16 | 1 | 1 |
| 1 | 8 | GI1_192 | 16 | 1 | 2 |
| 2 | 8 | GI1_192 | 16 | 1 | 3 |
| 3 | 8 | GI1_192 | 16 | 1 | 4 |
| 4 | 8 | GI1_192 | 16 | 1 | 5 |
| 5 | 8 | GI1_192 | 16 | 1 | 6 |
| 6 | 8 | GI1_192 | 16 | 1 | 7 |
| 7 | 8 | GI2_384 | 8 | 1 | 1 |
| 8 | 8 | GI2_384 | 8 | 1 | 2 |
| 9 | 8 | GI2_384 | 8 | 1 | 3 |
| 10 | 8 | GI2_384 | 8 | 1 | 4 |
| 11 | 8 | GI2_384 | 8 | 1 | 5 |
| 12 | 8 | GI2_384 | 8 | 1 | 6 |
| 13 | 8 | GI2_384 | 8 | 1 | 7 |
| 14 | 8 | GI3_512 | 6 | 1 | 1 |
| 15 | 8 | GI3_512 | 6 | 1 | 2 |
| 16 | 8 | GI3_512 | 6 | 1 | 3 |
| 17 | 8 | GI3_512 | 6 | 1 | 4 |
| 18 | 8 | GI3_512 | 6 | 1 | 5 |
| 19 | 8 | GI3_512 | 6 | 1 | 6 |
| 20 | 8 | GI3_512 | 6 | 1 | 7 |
| 21 | 8 | GI4_768 | 4 | 1 | 1 |
| 22 | 8 | GI4_768 | 4 | 1 | 2 |
| 23 | 8 | GI4_768 | 4 | 1 | 3 |
| 24 | 8 | GI4_768 | 4 | 1 | 4 |
| 25 | 8 | GI4_768 | 4 | 1 | 5 |
| 26 | 8 | GI4_768 | 4 | 1 | 6 |
| 27 | 8 | GI4_768 | 4 | 1 | 7 |
| 28 | 8 | GI5_1024 | 3 | 1 | 1 |
| 29 | 8 | GI5_1024 | 3 | 1 | 2 |
| 30 | 8 | GI5_1024 | 3 | 1 | 3 |
| 31 | 8 | GI5_1024 | 3 | 1 | 4 |
| 32 | 8 | GI5_1024 | 3 | 1 | 5 |
| 33 | 8 | GI5_1024 | 3 | 1 | 6 |
| 34 | 8 | GI5_1024 | 3 | 1 | 7 |
| 35 | 8 | GI6_1536 | 4 | 1 | 1 |
| 36 | 8 | GI6_1536 | 4 | 1 | 2 |
| 37 | 8 | GI6_1536 | 4 | 1 | 3 |
| 38 | 8 | GI6_1536 | 4 | 1 | 4 |
| 39 | 8 | GI6_1536 | 4 | 1 | 5 |
| 40 | 8 | GI6_1536 | 4 | 1 | 6 |
| 41 | 8 | GI6_1536 | 4 | 1 | 7 |
| 42 | 8 | GI7_2048 | 3 | 1 | 1 |
| 43 | 8 | GI7_2048 | 3 | 1 | 2 |
| 44 | 8 | GI7_2048 | 3 | 1 | 3 |
| 45 | 8 | GI7_2048 | 3 | 1 | 4 |

| Pattern (8 bits) | FFT | GI | Dx | Dy | UL Mode |
|---|---|---|---|---|---|
| 46 | 8 | GI7_2048 | 3 | 1 | 5 |
| 47 | 8 | GI7_2048 | 3 | 1 | 6 |
| 48 | 8 | GI7_2048 | 3 | 1 | 7 |
| 49 | 16 | GI1_192 | 32 | 1 | 1 |
| 50 | 16 | GI1_192 | 32 | 1 | 2 |
| 51 | 16 | GI1_192 | 32 | 1 | 3 |
| 52 | 16 | GI1_192 | 32 | 1 | 4 |
| 53 | 16 | GI1_192 | 32 | 1 | 5 |
| 54 | 16 | GI1_192 | 32 | 1 | 6 |
| 55 | 16 | GI1_192 | 32 | 1 | 7 |
| 56 | 16 | GI2_384 | 16 | 1 | 1 |
| 57 | 16 | GI2_384 | 16 | 1 | 2 |
| 58 | 16 | GI2_384 | 16 | 1 | 3 |
| 59 | 16 | GI2_384 | 16 | 1 | 4 |
| 60 | 16 | GI2_384 | 16 | 1 | 5 |
| 61 | 16 | GI2_384 | 16 | 1 | 6 |
| 62 | 16 | GI2_384 | 16 | 1 | 7 |
| 63 | 16 | GI3_512 | 12 | 1 | 1 |
| 64 | 16 | GI3_512 | 12 | 1 | 2 |
| 65 | 16 | GI3_512 | 12 | 1 | 3 |
| 66 | 16 | GI3_512 | 12 | 1 | 4 |
| 67 | 16 | GI3_512 | 12 | 1 | 5 |
| 68 | 16 | GI3_512 | 12 | 1 | 6 |
| 69 | 16 | GI3_512 | 12 | 1 | 7 |
| 70 | 16 | GI4_768 | 8 | 1 | 1 |
| 71 | 16 | GI4_768 | 8 | 1 | 2 |
| 72 | 16 | GI4_768 | 8 | 1 | 3 |
| 73 | 16 | GI4_768 | 8 | 1 | 4 |
| 74 | 16 | GI4_768 | 8 | 1 | 5 |
| 75 | 16 | GI4_768 | 8 | 1 | 6 |
| 76 | 16 | GI4_768 | 8 | 1 | 7 |
| 77 | 16 | GI5_1024 | 6 | 1 | 1 |
| 78 | 16 | GI5_1024 | 6 | 1 | 2 |
| 79 | 16 | GI5_1024 | 6 | 1 | 3 |
| 80 | 16 | GI5_1024 | 6 | 1 | 4 |
| 81 | 16 | GI5_1024 | 6 | 1 | 5 |
| 82 | 16 | GI5_1024 | 6 | 1 | 6 |
| 83 | 16 | GI5_1024 | 6 | 1 | 7 |
| 84 | 16 | GI6_1536 | 4 | 1 | 1 |
| 85 | 16 | GI6_1536 | 4 | 1 | 2 |
| 86 | 16 | GI6_1536 | 4 | 1 | 3 |
| 87 | 16 | GI6_1536 | 4 | 1 | 4 |
| 88 | 16 | GI6_1536 | 4 | 1 | 5 |
| 89 | 16 | GI6_1536 | 4 | 1 | 6 |
| 90 | 16 | GI6_1536 | 4 | 1 | 7 |
| 91 | 16 | GI7_2048 | 3 | 1 | 1 |
| 92 | 16 | GI7_2048 | 3 | 1 | 2 |

| Pattern (8 bits) | FFT | GI | Dx | Dy | L1 Mode |
|---|---|---|---|---|---|
| 93 | 16 | GI7_2048 | 3 | 1 | 3 |
| 94 | 16 | GI7_2048 | 3 | 1 | 4 |
| 95 | 16 | GI7_2048 | 3 | 1 | 5 |
| 96 | 16 | GI7_2048 | 3 | 1 | 6 |
| 97 | 16 | GI7_2048 | 3 | 1 | 7 |
| 98 | 16 | GI8_2432 | 3 | 1 | 1 |
| 99 | 16 | GI8_2432 | 3 | 1 | 2 |
| 100 | 16 | GI8_2432 | 3 | 1 | 3 |
| 101 | 16 | GI8_2432 | 3 | 1 | 4 |
| 102 | 16 | GI8_2432 | 3 | 1 | 5 |
| 103 | 16 | GI8_2432 | 3 | 1 | 6 |
| 104 | 16 | GI8_2432 | 3 | 1 | 7 |
| 105 | 16 | GI9_3072 | 4 | 1 | 1 |
| 106 | 16 | GI9_3072 | 4 | 1 | 2 |
| 107 | 16 | GI9_3072 | 4 | 1 | 3 |
| 108 | 16 | GI9_3072 | 4 | 1 | 4 |
| 109 | 16 | GI9_3072 | 4 | 1 | 5 |
| 110 | 16 | GI9_3072 | 4 | 1 | 6 |
| 111 | 16 | GI9_3072 | 4 | 1 | 7 |
| 112 | 16 | GI10_3648 | 4 | 1 | 1 |
| 113 | 16 | GI10_3648 | 4 | 1 | 2 |
| 114 | 16 | GI10_3648 | 4 | 1 | 3 |
| 115 | 16 | GI10_3648 | 4 | 1 | 4 |
| 116 | 16 | GI10_3648 | 4 | 1 | 5 |
| 117 | 16 | GI10_3648 | 4 | 1 | 6 |
| 118 | 16 | GI10_3648 | 4 | 1 | 7 |
| 119 | 16 | GI11_4096 | 3 | 1 | 1 |
| 120 | 16 | GI11_4096 | 3 | 1 | 2 |
| 121 | 16 | GI11_4096 | 3 | 1 | 3 |
| 122 | 16 | GI11_4096 | 3 | 1 | 4 |
| 123 | 16 | GI11_4096 | 3 | 1 | 5 |
| 124 | 16 | GI11_4096 | 3 | 1 | 6 |
| 125 | 16 | GI11_4096 | 3 | 1 | 7 |
| 126 | 32 | - | 32 | 1 | 1 |
| 127 | 32 | - | 32 | 1 | 2 |
| 128 | 32 | - | 32 | 1 | 3 |
| 129 | 32 | - | 32 | 1 | 4 |
| 130 | 32 | - | 32 | 1 | 5 |
| 131 | 32 | - | 32 | 1 | 6 |
| 132 | 32 | - | 32 | 1 | 7 |
| 133 | 32 | - | 24 | 1 | 1 |
| 134 | 32 | - | 24 | 1 | 2 |
| 135 | 32 | - | 24 | 1 | 3 |
| 136 | 32 | - | 24 | 1 | 4 |
| 137 | 32 | - | 24 | 1 | 5 |
| 138 | 32 | - | 24 | 1 | 6 |
| 139 | 32 | - | 24 | 1 | 7 |

| Pattern (8 bits) | FFT | GI | Dx | Dy | L1 Mode |
|---|---|---|---|---|---|
| 140 | 32 | - | 16 | 1 | 1 |
| 141 | 32 | - | 16 | 1 | 2 |
| 142 | 32 | - | 16 | 1 | 3 |
| 143 | 32 | - | 16 | 1 | 4 |
| 144 | 32 | - | 16 | 1 | 5 |
| 145 | 32 | - | 16 | 1 | 6 |
| 146 | 32 | - | 16 | 1 | 7 |
| 147 | 32 | - | 12 | 1 | 1 |
| 148 | 32 | - | 12 | 1 | 2 |
| 149 | 32 | - | 12 | 1 | 3 |
| 150 | 32 | - | 12 | 1 | 4 |
| 151 | 32 | - | 12 | 1 | 5 |
| 152 | 32 | - | 12 | 1 | 6 |
| 153 | 32 | - | 12 | 1 | 7 |
| 154 | 32 | - | 8 | 1 | 1 |
| 155 | 32 | - | 8 | 1 | 2 |
| 156 | 32 | - | 8 | 1 | 3 |
| 157 | 32 | - | 8 | 1 | 4 |
| 158 | 32 | - | 8 | 1 | 5 |
| 159 | 32 | - | 8 | 1 | 6 |
| 160 | 32 | - | 8 | 1 | 7 |
| 161 | 32 | - | 6 | 1 | 1 |
| 162 | 32 | - | 6 | 1 | 2 |
| 163 | 32 | - | 6 | 1 | 3 |
| 164 | 32 | - | 6 | 1 | 4 |
| 165 | 32 | - | 6 | 1 | 5 |
| 166 | 32 | - | 6 | 1 | 6 |
| 167 | 32 | - | 6 | 1 | 7 |
| 168 | 32 | - | 3 | 1 | 1 |
| 169 | 32 | - | 3 | 1 | 2 |
| 170 | 32 | - | 3 | 1 | 3 |
| 171 | 32 | - | 3 | 1 | 4 |
| 172 | 32 | - | 3 | 1 | 5 |
| 173 | 32 | - | 3 | 1 | 6 |
| 174 | 32 | - | 3 | 1 | 7 |
| 175 | Reserved | | | | |
| 176 | Reserved | | | | |
| 177 | Reserved | | | | |
| 178 | Reserved | | | | |
| 179 | Reserved | | | | |
| 180 | Reserved | | | | |
| 181 | Reserved | | | | |
| 182 | Reserved | | | | |
| 183 | Reserved | | | | |
| 184 | Reserved | | | | |
| 185 | Reserved | | | | |
| 186 | Reserved | | | | |

| Pattern (8 bits) | FFT | GI | Dx | Dy | L1 Mode |
|---|---|---|---|---|---|
| 187 | Reserved | | | | |
| 188 | Reserved | | | | |
| 189 | Reserved | | | | |
| 190 | Reserved | | | | |
| 191 | Reserved | | | | |
| 192 | Reserved | | | | |
| 193 | Reserved | | | | |
| 194 | Reserved | | | | |
| 195 | Reserved | | | | |
| 196 | Reserved | | | | |
| 197 | Reserved | | | | |
| 198 | Reserved | | | | |
| 199 | Reserved | | | | |
| 200 | Reserved | | | | |
| 201 | Reserved | | | | |
| 202 | Reserved | | | | |
| 203 | Reserved | | | | |
| 204 | Reserved | | | | |
| 205 | Reserved | | | | |
| 206 | Reserved | | | | |
| 207 | Reserved | | | | |
| 208 | Reserved | | | | |
| 209 | Reserved | | | | |
| 210 | Reserved | | | | |
| 211 | Reserved | | | | |
| 212 | Reserved | | | | |
| 213 | Reserved | | | | |
| 214 | Reserved | | | | |
| 215 | Reserved | | | | |
| 216 | Reserved | | | | |
| 217 | Reserved | | | | |
| 218 | Reserved | | | | |
| 219 | Reserved | | | | |
| 220 | Reserved | | | | |
| 221 | Reserved | | | | |
| 222 | Reserved | | | | |
| 223 | Reserved | | | | |
| 224 | Reserved | | | | |
| 225 | Reserved | | | | |
| 226 | Reserved | | | | |
| 227 | Reserved | | | | |
| 228 | Reserved | | | | |
| 229 | Reserved | | | | |
| 230 | Reserved | | | | |
| 231 | Reserved | | | | |
| 232 | Reserved | | | | |
| 233 | Reserved | | | | |

| Pattern (8 bits) | FFT | GI | Dx | Dy | L1 Mode |
|---|---|---|---|---|---|
| 234 | Reserved | | | | |
| 235 | Reserved | | | | |
| 236 | Reserved | | | | |
| 237 | Reserved | | | | |
| 238 | Reserved | | | | |
| 239 | Reserved | | | | |
| 240 | Reserved | | | | |
| 241 | Reserved | | | | |
| 242 | Reserved | | | | |
| 243 | Reserved | | | | |
| 244 | Reserved | | | | |
| 245 | Reserved | | | | |
| 246 | Reserved | | | | |
| 247 | Reserved | | | | |
| 248 | Reserved | | | | |
| 249 | Reserved | | | | |
| 250 | Reserved | | | | |
| 251 | Reserved | | | | |
| 252 | Reserved | | | | |
| 253 | Reserved | | | | |
| 254 | Reserved | | | | |
| 255 | Reserved | | | | |

*FIG. 13F*

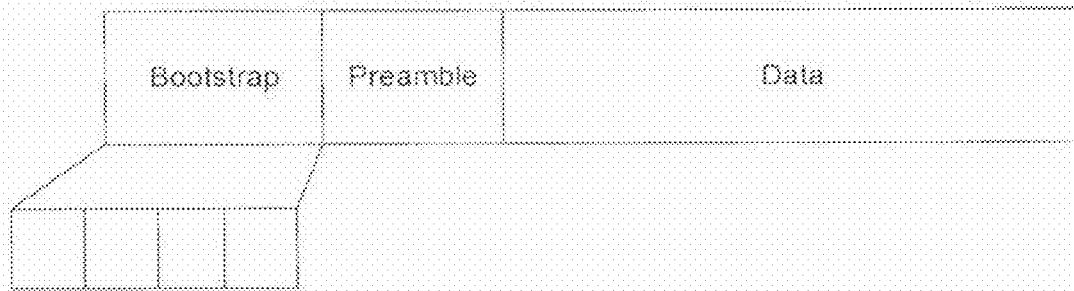
FIG. 14A
FFT/GI/SPP L1 mode
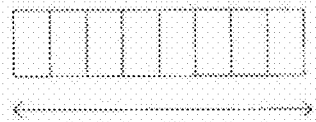
FIG. 14B
FFT/GI/SPP/L1 mode
FIG. 14C
FFT/GI/SPP L1 mode
FIG. 14D
FFT/GI/SPP/L1 mode
FIG. 14E
FFT/GI/SPP L1 mode
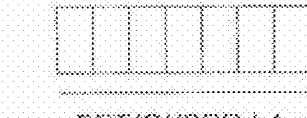
FIG. 14F
FFT/GI/SPP L1 mode

SIGNALING METHODS AND APPARATUS

CROSS-REFERENCE TO RELATED APPLICATIONS

This application is a continuation of U.S. Ser. No. 14/746,541, filed Jun. 22, 2015, the entire content of which is incorporated herein by reference.

TECHNICAL FIELD

The present disclosure relates to methods and apparatuses for signaling parameters in a communication system.

BACKGROUND

Television broadcasting has evolved from basic analogue terrestrial broadcast television to complex digital systems. Wireless communication techniques are central to the development of the complex digital systems. There exists several wideband digital communication techniques depending on a broadcasting method used. For example, direct sequence spread spectrum (DSSS) and orthogonal frequency-division multiplexing (OFDM) are one of the latest schemes in wideband digital communication systems. OFDM is a method of encoding digital data on multiple carrier frequencies and is used in applications such as digital television and audio broadcasting, Digital Subscriber Line (DSL) internet access, wireless networks, power line networks, and 4G mobile communications. OFDM has been selected as the wireless technique for the current generation of terrestrial television broadcast standards such as DVB-T2 and emerging standards such as ATSC 3.0.

A broadcasting standard may allow many modes of operations to be determined by the broadcaster. Thus, signaling parameters are needed by the receiver to decode efficiently, and correctly the received data. As recognized by the present inventors, there is a need to transmit signaling parameters in a predetermined number of bits.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present disclosure. The foregoing paragraphs have been provided by way of general introduction, and are not intended to limit the scope of the following claims. The described embodiments, together with further advantages, will be best understood by reference to the following detailed description taken in conjunction with the accompanying drawings.

SUMMARY

According to an embodiment of the present disclosure, there is provided a method for signaling preamble parameters of a preamble. The method includes generating, using processing circuitry of a transmission apparatus, a bootstrap symbol based on the parameters of the preamble. The method further includes prefixing, using the processing circuitry, the bootstrap symbol to a frame that includes the preamble. The bootstrap symbol is selected from a plurality of patterns. Further, the plurality of patterns represent at least a subset of predetermined combinations of the parameters of the preamble including an FFT (Fast Fourier Transform) size, a guard interval, a frequency domain displacement component of a SPP (Scattered Pilot Pattern) and a L1 mode.

According to an embodiment of the present disclosure, there is provided transmission apparatus, including a memory and circuitry. The circuitry is configured to: generate a bootstrap symbol based on signaling parameters of a preamble. The circuitry is further configured to prefix the bootstrap symbol to a frame that includes the preamble. The bootstrap symbol is selected from a plurality of patterns. Further, the plurality of patterns represent at least a subset of predetermined combinations of the parameters of the preamble including a FFT (Fast Fourier Transform) size, a guard interval, a frequency domain displacement component of a SPP (Scattered Pilot Pattern) and a L1 mode.

According to an embodiment of the present disclosure, there is provided a non-transitory computer-readable medium storing instructions, which when executed by a computer, causes the computer to perform the method for signaling preamble parameters, as described above.

According to an embodiment of the present disclosure, there is provided a method for decoding a preamble of a frame. The method includes detecting, using processing circuitry of a reception apparatus, a bootstrap symbol. The method further includes extracting, using the processing circuitry, signaling parameters of the preamble from the bootstrap symbol by referencing at least one look up table stored in a memory. The at least one look-up table includes a plurality of patterns representing at least a subset of predetermined combinations of the parameters of the preamble including an FFT (Fast Fourier Transform) size, a guard interval, a frequency domain displacement component of a SPP (Scattered Pilot Pattern) and a L1 mode.

Accordingly to an embodiment of the present disclosure, there is provided a reception apparatus including a memory and circuitry. The circuitry is configured to detect a bootstrap symbol. The circuitry is further configured to extract signaling parameters of a preamble of a frame from the bootstrap symbol by referencing at least one look-up table stored in the memory. The at least one look-up table includes a plurality of patterns representing at least a subset of predetermined combinations of the parameters of the preamble including an FFT (Fast Fourier Transform) size, a guard interval, a frequency domain displacement component of a SPP (Scattered Pilot Pattern) and a L1 mode.

According to an embodiment of the present disclosure, there is provided a non-transitory computer-readable medium storing instructions, which when executed by a computer, causes the computer to perform the method for decoding a preamble of a frame, as described above.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 6 shows tables for providing signaling patterns according to one example;

FIGS. 7A-7F show a table for providing signaling patterns according to one example;

FIG. 8 shows tables for providing signaling patterns according to one example;

FIGS. 9A-9C show a table for providing signaling patterns according to one example;

FIG. 10 shows tables for providing signaling patterns according to one example;

FIGS. 11A-11C show a table for providing signaling patterns according to one example;

FIG. 12 shows tables for providing signaling patterns according to one example;

FIGS. 13A-13F show a table for providing signaling patterns according to one example;

FIGS. 14A-14F show exemplary bootstrap symbol structures;

DETAILED DESCRIPTION

Figure 1:
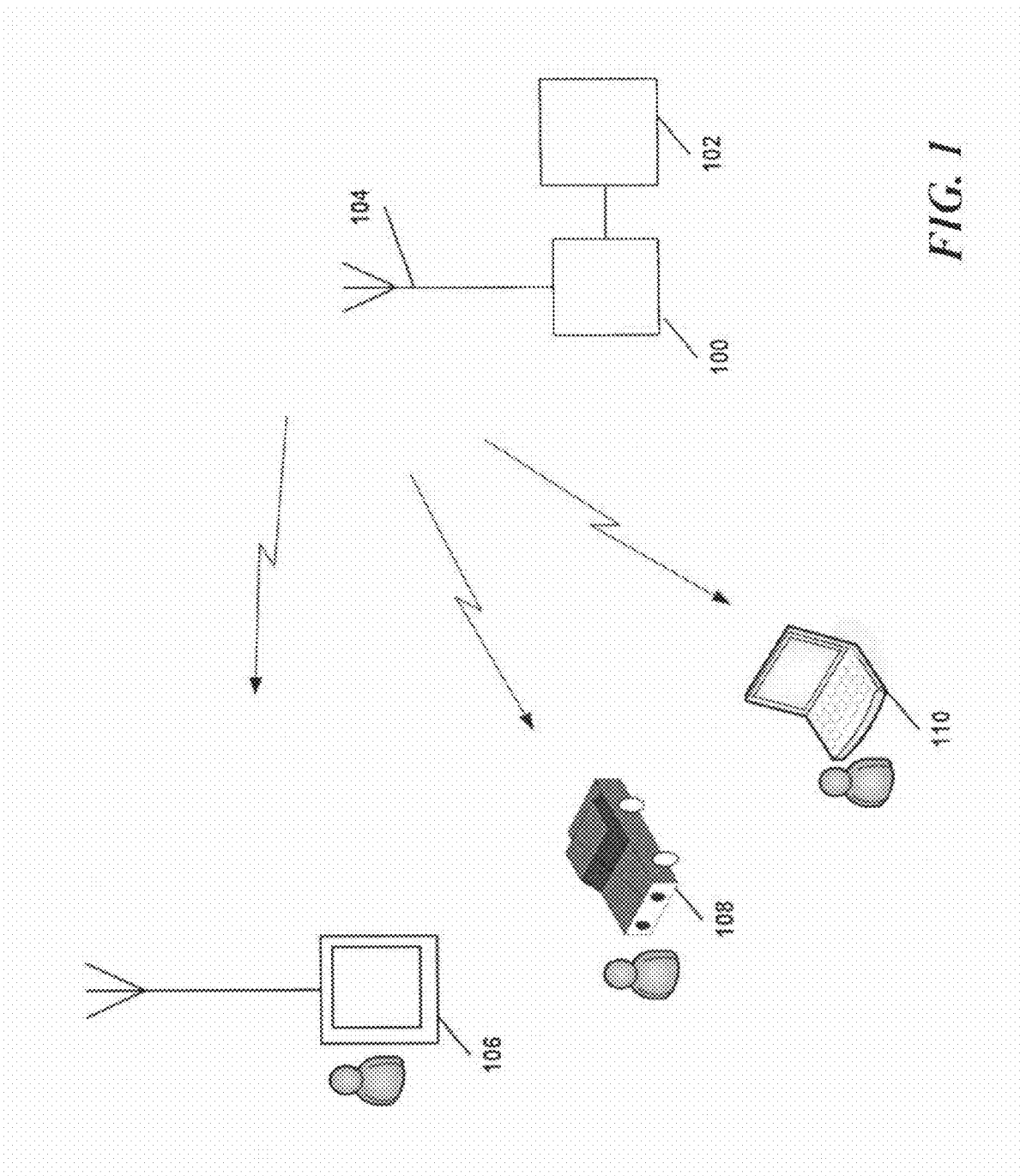
FIG. 1 is an exemplary system for broadcasting and receiving communication signals according to one example.

While the present disclosure is susceptible of embodiment in many different forms, there is shown in the drawings and will herein be described in detail specific embodiments, with the understanding that the present disclosure of such embodiments is to be considered as an example of the principles and not intended to limit the present disclosure to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a program module, a script, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The following description relates to methods and apparatuses for signaling parameters in a communication system.

FIG. 1 is an exemplary system for broadcasting and receiving communication signals according to one example. The communication signals may represent data where the communication signals may be digital television signals (e.g., terrestrial television broadcast signals). The communication system includes a transmitter 100, a core network 102, an antenna 104, and a plurality of user devices. The user devices may be televisions sets 106, mobiles handsets, personal video recorders or others devices configured to receive a communication signal. Each of the user devices includes an antenna to receive the communication signal. The user device includes reception circuitry. The reception circuitry may also be included in a vehicle 108 or a computer 110. The core network 102 includes a signal source such as for example a television studio camera that captures video and audio data and converts the data into a signal which is transmitted to the transmitter 100. The transmitter 100 processes the signal received from the core network 102 to transform the signal into a form suitable for transmission.

The signals carrying the data may be transmitted to the user devices over a terrestrial broadcast, a cable connection or a satellite link. The system may use any one or a variety of transmission techniques to communicate data to the user devices, for example the system may use a single or multicarrier technique.

The broadcasting system may employ a coded orthogonal frequency-division multiplexing (COFDM) scheme. COFDM is the same as orthogonal frequency-division multiplexing (OFDM) except that forward error correction is applied to the signal before transmission. OFDM is utilized in the terrestrial digital TV broadcasting system DVB-T (used in Europe) and integrated services digital broadcasting for terrestrial (ISDB-T) television broadcasting (used in Japan). COFDM is expected to be used in the future implementation of ATSC 3.0. COFDM is a multi-carrier modulation technique that can provide good performance in some wireless environments. In COFDM, the available bandwidth is divided into several orthogonal frequency sub-bands, which are also called sub-carriers. The partial allocation of the data payload to each subcarrier protects it against frequency selective fading. The number of subcarriers may be dependent on the standard used.

Figure 2:
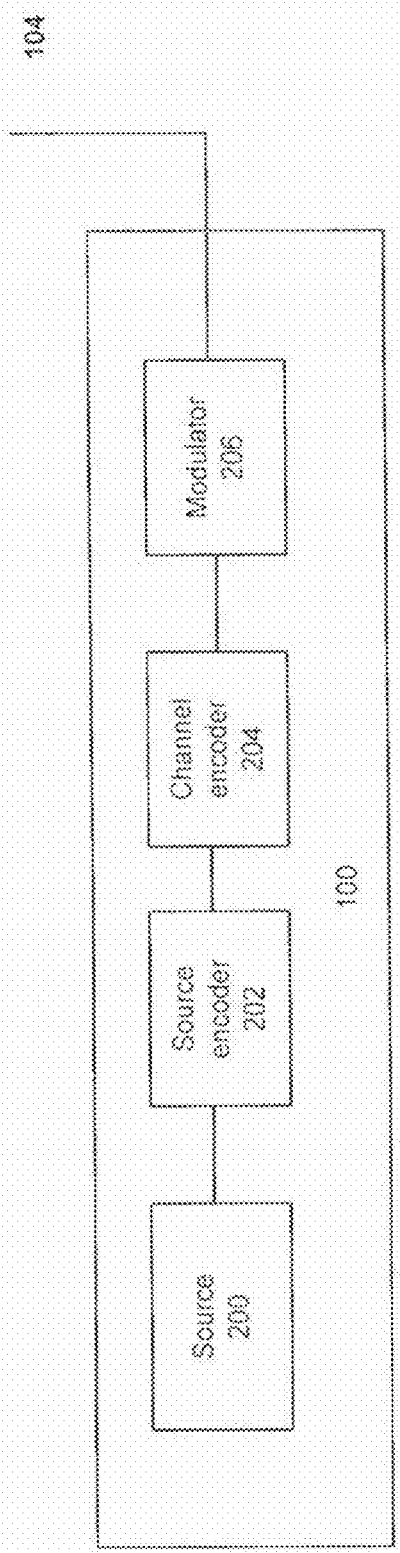
FIG. 2 is a schematic block diagram of an orthogonal frequency-division multiplexing (OFDM) transmitter according to one example.

FIG. 2 is a schematic block diagram of an OFDM transmitter according to one example. The transmitter 100 receives data from a source 200. The source 200 may be for audio, video, signaling, control or other data as would be understood by one of ordinary skill in the art. A source encoder 202 may include a data, audio, and video encoders to compress the audio, video and data. A channel encoder 204 may randomize, interleave, channel code, and frame map the compressed and signaling data. For example, the channel encoder 204 may include a frame builder that forms many data cells into sequences to be conveyed on OFDM symbols.

A modulator 206 (multiplexer) converts the processed digital data into modulation symbols, which can be, for example OFDM symbols (e.g., in the case of the proposed ATSC 3.0 standard). The multiplexed data is then passed to an inverse fast Fourier transformer (IFFT) which transforms a frequency domain signal into a time domain signal. The size of the IFFT is a function of the number of subcarriers, for example, in ATSC 3.0 the FFT and IFFT sizes may include 8K, 16K and 32K. A larger FFT size has the advantage of increased payload capacity while a smaller FFT size has the advantage of higher mobility.

The time domain signal is fed to a guard insertion module for generating a guard interval (GI) between symbols and then to a digital to analog (D/A) converter. The antenna 104 may perform up-conversion, RF amplification and over-the air broadcasting.

Figure 3:
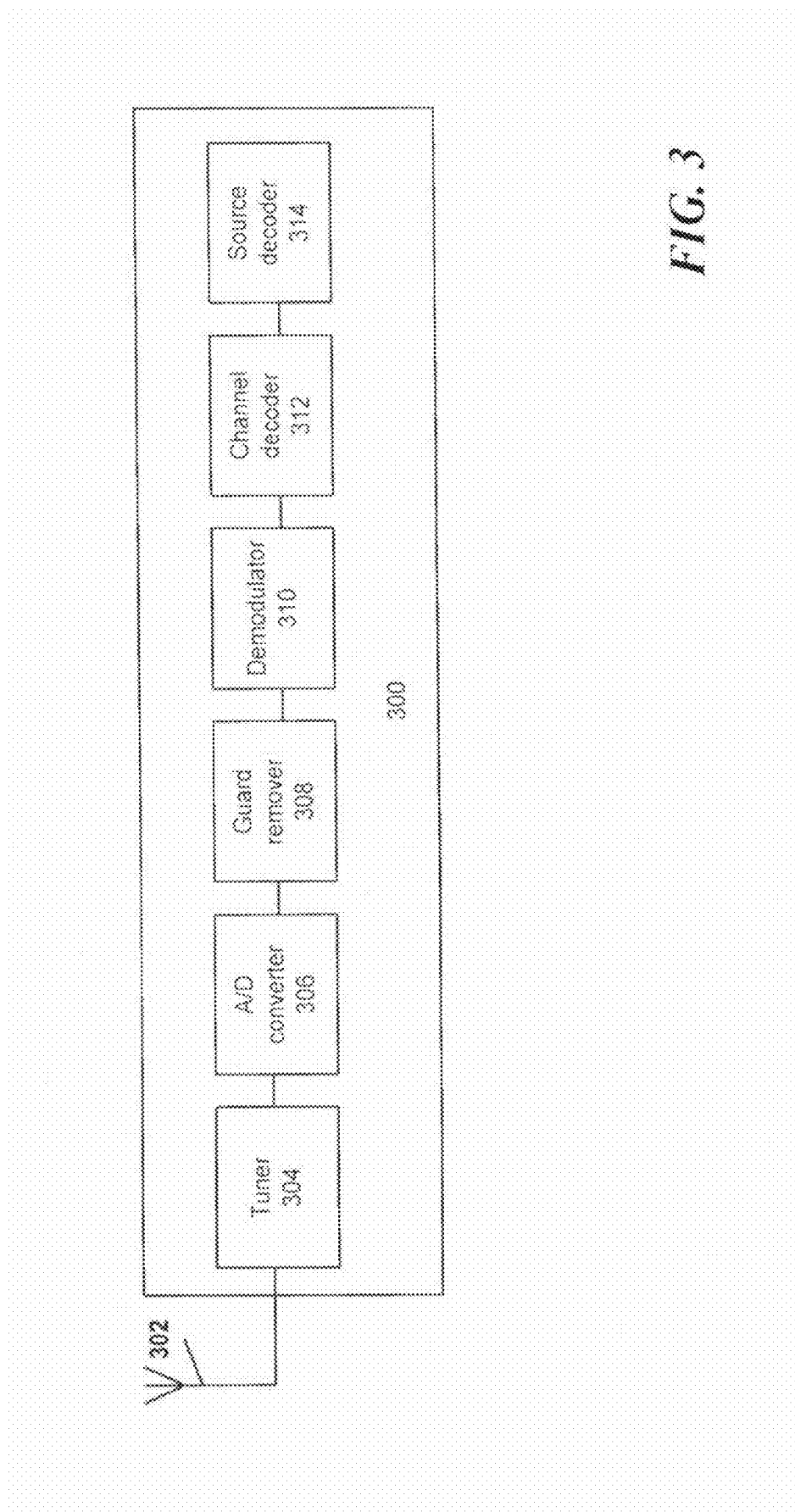
FIG. 3 is a schematic block diagram of an OFDM receiver according to one example.

FIG. 3 is a schematic block diagram of an OFDM receiver according to one example. The receiver 300 may be used to receive signals (e.g., digital television signals) transmitted from the transmitter 100 illustrated in FIG. 2. As shown in FIG. 3, an OFDM signal is received by an antenna 302 and detected by a tuner 304 and converted into digital form by an analogue-to-digital converter (ADC) 306. A guard remover 308 removes the guard interval from a received OFDM symbol, before the payload data and pilot data is recovered from the OFDM symbol using a demodulator 310.

A channel decoder 312 recovers the compressed and ancillary data by performing error correcting decoding, de-interleaving and de-randomizing. Then, a source decoder 314 decompresses the audio and video data.

As it is understood by one of ordinary skill in the art, some of the components of the transmitter 100 and the receiver 300 shown in FIGS. 2 and 3 may not be necessary. For example, the antennas are not required when the transmission system is not over-the-air but over cable. In addition, some of the components of the transmitter and receiver are not illustrated in FIGS. 2 and 3, for example, the transmitter may include an error correction coder. Details of an OFDM transmitter and receiver may be found in the DVB-T2 standard (ETSI EN 302 755), which is incorporated herein by reference in its entirety.

Figure 4:
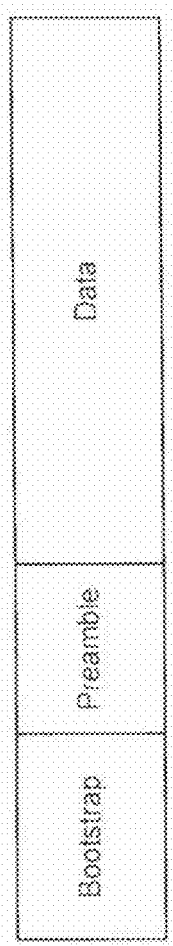
FIG. 4 shows an exemplary generic ATSC 3.0 frame structure according to one example.

FIG. 4 shows an exemplary generic ATSC 3.0 frame structure. An ATSC 3.0 frame includes three parts: a bootstrap, a preamble and data payload. Each of these parts may include one or more symbols. An example of the bootstrap is defined in ATSC Candidate Standard: System Discovery and Signaling (Doc. A/321 Part 1, Doc. S32-231r4—May 6, 2015), which is incorporated herein by reference in its entirety. The preamble carries the L1 signaling data for the following data symbols. The preamble occurs directly after the bootstrap and before any data symbols corresponding to the payload of the frame. The L1 signaling provides the necessary information to configure the physical layer parameters. The preamble may have different formats (configurations); thus, the bootstrap may be used to identify the preamble configuration. The signaling information may include a plurality of parameters that define preamble structure, including one or a combination of a modulation parameter (L1 mode), a FFT size, a guard interval, and a scattered pilot pattern (SPP).

The preamble configuration should be flexible to support a plurality of network types, network sizes, and service types. Thus, the parameters may include different combinations of FFT sizes, guard intervals, scattered pilot patterns, and L1 modes.

In one embodiment, L1 (layer-1) signaling may consist of two parts: L1-static and L1-dynamic. L1-static conveys signaling information which is static over the complete frame and also defines the parameters needed to decode L1-dynamic. L1-dynamic details the data format and the required information to decode the data payload. When the L1 signaling includes different parts (static and dynamic), the L1 mode as described in the present disclosure refers to the first part (L1 static), in one embodiment.

The bootstrap may have a limited number of bits available for signaling the preamble, thus, the preamble configurations may be limited to the number of preamble configurations that can be signaled in the limited number of bits. Thus, in certain embodiments, the data payload may have a higher number of configurations than the preamble. Further, the preamble and the data payload may or may not use a same configuration. The preamble configuration may be represented by one of a plurality of patterns. In one embodiment, the plurality of patterns represent at least a subset of predetermined combinations used in the data payload. The predetermined combinations may be allowable combinations of a FFT size, a guard interval, a frequency domain displacement component of a scattered pilot pattern (SPP), and a L1 mode for example to be defined in the proposed ATSC standard.

The receiver 300 starts by decoding the bootstrap, which includes the information needed to decode the preamble. Then the receiver 300 decodes the preamble, which includes the information needed to decode the payload. The guard remover 308 removes the guard interval of a preamble symbol based on the guard interval included in the signaled preamble parameters. The demodulator 310 demodulates the preamble symbol based on the FFT size and the SPP signaled in the preamble parameters. The channel decoder 312 performs error-correcting decoding of the preamble symbols based on the L1 mode.

The bootstrap provides a universal entry point into a broadcast waveform. The bootstrap employs a fixed configuration known to all receivers. The bootstrap includes one or more symbols. For example, the bootstrap may include four symbols. A first symbol may be used for synchronization and indication of a version. A second symbol may be used to signal Emergency Alert System (EAS) information, system bandwidth, and a time interval to the next frame. A third symbol may indicate a sample rate. A fourth symbol may indicate the preamble structure. Each of the symbols may use a predefined number of bits.

In one embodiment, the fourth symbol of the bootstrap may be used to signal the structure of one or more RF symbols, for example corresponding to a preamble, following the last bootstrap symbol. The bootstrap includes a predetermined number of bits for signaling parameters needed to decode the preamble (e.g., one or a combination of the modulation parameter, the FFT size, the guard interval, and the scattered pilot pattern (SPP)). In one embodiment, the fourth symbol of the bootstrap has 7-bits to be used for signaling the parameters of the preamble. The 7-bits may be used to represent $2^7=128$ patterns. Thus, the number of configurations for the preamble is limited to 128. In other embodiments, the predetermined number of bits is 8 which may be used to represent $2^8=256$ patterns. In this case, the number of configurations for the preamble is limited to 256.

The necessary information needed by the receiver 300 to decode a preamble includes FFT size, scattered pilot pattern, guard interval, and encoding parameters (L1 modes). In certain embodiments, the FFT size may be 8K, 16K or 32K. Thus, 2 bits are needed to represent the FFT size to the receiver. A higher FFT size gives a higher number of carriers at the expense of a smaller bandwidth. The smaller bandwidth is more prone to Doppler shift. The service provider may choose an appropriate FFT size based on the broadcasting contents such as 4 k content (e.g., which are directed to stationary devices) or mobile content (e.g., which are directed to portable devices).

Pilots in an OFDM system are transmitted on selected subcarriers in order to estimate an impulse response of the channel as would be understood by one of ordinary skill in the art. The pilots may be scattered pilots (SPs). The SPs are subcarriers that carry pilot symbols in some OFDM symbols but not others. The SP follows a pattern which is conventionally defined by $D_x$ and $D_y$. A given carrier k of the OFDM signal on a given symbol l will be a scattered pilot if the appropriate equation below is satisfied:

$$k \bmod (D_x, D_y) = D_x (l \bmod D_y) \quad (1)$$

where Dx is the separation of pilot bearing carriers (frequency direction) and Dy is the number of symbols forming one scattered pilot sequence (time direction). The pilot pattern designation may be written as $SP_{a\_b}$ where a=$D_x$ and b=$D_y$. The pilot pattern may be chosen from sixteen different combinations; thus, 4 bits are needed to represent the pilot pattern. The pilot pattern may be SP32_2, SP32_4, SP24_2, SP24_4, SP16_2, SP16_4, SP12_2, SP12_4, SP8_2, SP8_4, SP6_2, SP6_4, SP4_2, SP4_4, SP3_2, or SP3_4. In another embodiment, only 12 pilot patterns may be chosen.

The guard interval is generated by copying samples from the end of the symbol. Then the receiver 300 correlates a section corresponding to the guard interval with the received OFDM symbol to detect, in the time domain, a position of the useful part of the OFDM symbol. The guard interval may be 192, 384, 512, 768, 1024, 1536, 2048, 2432, 3072, 3648, 4096, or 4864. The GI may be chosen from 12 different modes; thus, 4 bits are needed to represent it. A larger guard interval makes the OFDM symbol more robust to multipath at the expense of the capacity.

In addition, the encoding parameter (L1 mode) may be chosen from seven modes thus 3 bits are needed to represent it. The L1 modes are related to the coding and modulation chosen which are a function of the power added to the signal. The L1 modes may represent allowable combinations of a code rate and modulation type used. For example, the modulation type may be QPSK, 16NUC, 64-NUC or the like. The code rate may be 3/15, 6/15, or the like. The L1 modes provide a range of robustness. Thus, in order to individually signal all the parameters needed by the receiver 300, thirteen bits are needed which is higher than the predetermined number of bits available as proposed by ATSC 3.0 (7 or 8 bits). In other embodiments, the total number of bits needed varies when the number of allowable FFT sizes, pilot patterns, guard intervals, and/or L1 modes is changed.

In total there are 4032 different possible patterns which are higher than the number of patterns covered by the predetermined number of bits 7 (4032>128). In addition, it is useful if the signaling method accommodates further expansions of the system such as to signal MIMO or LDM. The receiver 300 may not be able to decode efficiently when the signaling parameters are missing or incomplete. As for example, the receiver 300 may have to determine the FFT size or other parameters by trial and error. In addition, there is no reason to map certain L1 modes to certain FFT/GI/SPP combinations, thus the receiver 300 needs the complete parameters to avoid a time consuming trial and error process.

Table 1 shows the allowable combinations of scattered pilot patterns, FFT size and guard intervals according to one embodiment. Table 1 shows the allowable combinations of scattered pilot patterns, FFT size, and guard interval for the data payload, and/or the preamble. In certain embodiments, only a subset of the allowable combinations for the data payload are signaled, and/or permitted, for the preamble in order to properly signal the preamble parameters in a limited number of bits. There are 81 valid combinations for the guard interval, FFT, and pilot pattern parameters. As would be understood by one of ordinary skill in the art, Table 1 shows exemplary allowable combinations. Other systems or modes may have different allowable combinations. For example, Table 1 may apply for SISO mode as proposed by ATSC 3.0.

TABLE 1

Allowable combinations of scattered pilot patterns, FFT size and guard interval

| GI Pattern | Samples | 8K FFT | 16K FFT | 32K FFT |
|---|---|---|---|---|
| GI1_192 | 192 | SP32_2, SP32_4, SP16_2, SP16_4 | SP32_2, SP32_4 | SP32_2 |
| GI2_384 | 384 | SP16_2, SP16_4, SP8_2, SP8_4 | SP32_2, SP32_4, SP16_2, SP16_4 | SP32_2 |
| GI3_512 | 512 | SP12_2, SP12_4, SP6_2, SP6_4 | SP24_2, SP24_4, SP12_2, SP12_4 | SP24_2 |
| GI4_768 | 768 | SP8_2, SP8_4, SP4_2, SP4_4 | SP16_2, SP16_4, SP8_2, SP8_4 | SP32_2, SP16_2 |
| GI5_1024 | 1024 | SP6_2, SP6_4, SP3_2, SP3_4 | SP12_2, SP12_4, SP6_2, SP6_4 | SP24_2, SP12_2 |
| GI6_1536 | 1536 | SP4_2, SP4_4 | SP8_2, SP8_4, SP4_2, SP4_4 | SP16_2, SP8_2 |
| GI7_2048 | 2048 | SP3_2, SP3_4 | SP6_2, SP6_4, SP3_2, SP3_4 | SP12_2, SP6_2 |
| GI8_2432 | 2432 | NA | SP6_2, SP6_4, SP3_2, SP3_4 | SP12_2, SP6_2 |
| GI9_3072 | 3072 | NA | SP4_2, SP4_4 | SP8_2, SP3_2 |
| GI10_3648 | 3648 | NA | SP4_2, SP4_4 | SP8_2, SP3_2 |
| GI11_4096 | 4096 | NA | SP3_2, SP3_4 | SP6_2, SP3_2 |
| GI12_4864 | 4864 | NA | NA | SP6_2, SP3_2 |

As the preamble may include few symbols or in certain embodiments only one symbol, the time domain displacement between successive OFDM symbols carrying one or more pilots symbols on the same sub-carrier $D_y$ may be equal to one. When $D_y$ is equal to one, the number of valid combinations can be reduced to 51 in one embodiment. Table 2 shows the allowable combinations with $D_y=1$. The number of bits needed to represent the allowable patterns is still higher than the number of available bits described above. Further, the frequency displacement between sub-carriers which are used to carry pilot symbols ($D_x$) may be equal to the lowest displacement for each FFT size and guard interval combination when the displacements are multiples of each other to further decrease the number of bits needed to represent the allowable patterns. For example, referring to Tables 2 and 3, for 8K FFT and GI1_192, the allowable frequency domain displacement component values of the SPP are 32 and 16. Since 32 is a multiple of 16, only the lowest displacement of 16 is set as an allowable frequency domain displacement component value of the SPP for the 8K FTT and GI1_192 combination. However, both of the allowable frequency domain displacement component values of 8 and 3 are set as allowable values of the SPP for the combination of 32K FFT and GI10_3648 because 8 is not a multiple of 3.

Figure 5:
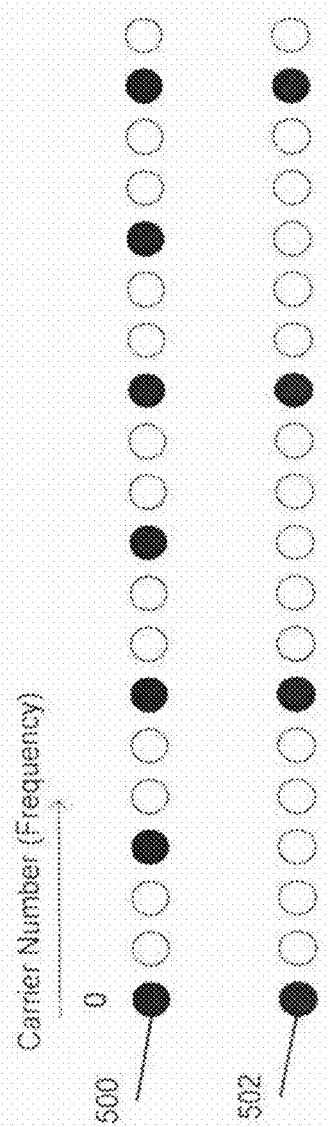
FIG. 5 is a schematic that shows sequences of OFDM symbols showing sub-carriers with scattered pilots (SP) carrier symbols according to one example.

FIG. 5 is a schematic that shows sequences of OFDM symbols showing sub-carriers with scattered pilot (SP) carrier symbols according to one example. The schematic shows a first sequence 500 of OFDM symbols for $D_y=1$ and $D_x=3$ and a second sequence 502 of OFDM symbols for $D_y=1$ and $D_x=6$. In the first sequence 500, a pilot exists every 3 carriers and in the second sequence 502, a pilot exists every six carriers. The preamble may have a SPP according to the first sequence 500 and the payload may have a SPP according to the second sequence 502 without having discontinuities between the preamble and the payload. In another example, SP16_1 has a pilot every 16 carriers and S32_1 has a pilot every 32 carriers. Thus, taking the lower $D_x$ does not cause a discontinuity in the pilot pattern between the preamble and the payload when $D_x$ are multiples of each other as would be understood by one of ordinary skill in the art. The subset may then include the patterns with the lower D. For example, when the predetermined combinations includes a first combination having a guard interval of 192, a FFT size of 8K, and a frequency domain displacement ($D_x$) of 32 and a second combination having a guard interval of 192, a FFT size of 8K, and a frequency domain displacement of 16, the subset may then include the second combination. In another example, the predetermined combinations may include a first combination having a guard interval of 3072, a FFT size of 32, and a $D_x$ of 8 and a second combination having a guard interval of 3072, a FFT size of 32, and a $D_x$ of 3, the subset may then include the first and the second combination.

TABLE 2

Allowable combinations of scattered pilot patterns, FFT size and guard interval

| GI Pattern | Samples | 8K FFT | 16K FFT | 32K FFT |
| --- | --- | --- | --- | --- |
| GI1_192 | 192 | SP32_1, SP16_1 | SP32_1, | SP32_1 |
| GI2_384 | 384 | SP16_1, SP8_1 | SP32_1, SP16_1 | SP32_1 |
| GI3_512 | 512 | SP12_1, SP6_1 | SP24_1, SP12_1 | SP24_1 |

TABLE 2-continued

Allowable combinations of scattered pilot patterns, FFT size and guard interval

| GI Pattern | Samples | 8K FFT | 16K FFT | 32K FFT |
| --- | --- | --- | --- | --- |
| GI4_768 | 768 | SP8_1, SP4_1 | SP16_1, SP8_1 | SP32_1, SP16_1 |
| GI5_1024 | 1024 | SP6_1, SP3_1 | SP12_1, SP6_1 | SP24_1, SP12_1 |
| GI6_1536 | 1536 | SP4_1 | SP8_1, SP4_1 | SP16_1, SP8_1 |
| GI7_2048 | 2048 | SP3_1 | SP6_1, SP3_1 | SP12_1, SP6_1 |
| GI8_2432 | 2432 | NA | SP6_1, SP3_1 | SP12_1, SP6_1 |
| GI9_3072 | 3072 | NA | SP4_1 | SP8_1, SP3_1 |
| GI10_3648 | 3648 | NA | SP4_1 | SP8_1, SP3_1 |
| GI11_4096 | 4096 | NA | SP3_1 | SP6_1, SP3_1 |
| GI12_4864 | 4864 | NA | NA | SP6_1, SP3_1 |

TABLE 3

Allowable combinations of scattered pilot patterns, FFT size and guard interval

| GI Pattern | Samples | 8K FFT | 16K FFT | 32K FFT |
| --- | --- | --- | --- | --- |
| GI1_192 | 192 | SP16_1 | SP32_1 | SP32_1 |
| GI2_384 | 384 | SP8_1 | SP16_1 | SP32_1 |
| GI3_512 | 512 | SP6_1 | SP12_1 | SP24_1 |
| GI4_768 | 768 | SP4_1 | SP8_1 | SP16_1 |
| GI5_1024 | 1024 | SP3_1 | SP6_1 | SP12_1 |
| GI6_1536 | 1536 | SP4_1 | SP4_1 | SP8_1 |
| GI7_2048 | 2048 | SP3_1 | SP3_1 | SP6_1 |
| GI8_2432 | 2432 | NA | SP3_1 | SP6_1 |
| GI9_3072 | 3072 | NA | SP4_1 | SP3_1, SP8_1 |
| GI10_3648 | 3648 | NA | SP4_1 | SP3_1, SP8_1 |
| GI11_4096 | 4096 | NA | SP3_1 | SP3_1 |
| GI12_4864 | 4864 | NA | NA | SP3_1 |

When only the lower $D_x$ (if the $D_x$'s are multiples of each other) is selected for each FFT/GI parameter combination then, the allowable combinations can be reduced to 32. Table 3 shows the allowable FFT/GI/SPP according to one example.

Considering the 7 possible modes for the L1 mode parameters in addition to the allowable combinations of FFT, GI, and SPP, the total allowable patterns (e.g., the subset of allowable combinations) is 224. Thus the allowable pattern may be represented if 8 bits are available in the fourth symbol of the bootstrap.

The preamble may use any of the FFT sizes available to the payload. The signaling method and associated apparatus described herein signal the FFT size to the receiver. Thus, in one embodiment, the subset of predetermined combinations includes at least one combination for each FFT size available. In other words, when the FFT sizes are 8K, 16K, and 32K, the FFT size of at least a first one of the plurality of patterns is 8K, the FFT size of a second one of the plurality of patterns is 16K, and the FFT size of at least a third one of the plurality of patterns is 32K. However, one or more FFT sizes may be excluded from the subset in other embodiments.

In one embodiment, the 32 allowable combinations for the FFT/GI/SPP may be signaled separately from the encoding parameters. The FFT/GI/SPP parameters may be signaled using 5-bits. The L1 mode parameter (encoding parameter) may be signaled using 3-bits. One unused pattern may be used as a MIMO (Multiple inputs multiple outputs) or LDM (Layered division multiplexing) flag. FIG. 6 illustrates the plurality of patterns associated with this embodiment. In this embodiment, at least one combination for each of the plurality of guard intervals is included in the subset of predetermined combinations.

FIG. 6 shows two tables providing signaling patterns according to one example. Table 600 shows the pattern for the FFT/GI/SPP parameters. Table 602 shows the L1 pattern. As shown an extra pattern may be reserved. The extra pattern may be used as a MIMO or LDM flag. FIG. 14A shows the structure of the last symbol in the bootstrap. For example, the first five bits are used to signal FFT/GI/SPP parameters and the last three bits are used to signal the L1 mode. However, the L1 mode bits may appear first in other embodiments. For example, when the broadcaster wants to use the following combination FFT size=16, guard interval=192, $D_x$=32 and L1 mode=1, the transmitter 100 uses the following fourth bootstrap symbol="00111001". Once the receiver detects the fourth bootstrap symbol "00111001", the receiver uses a look-up table to match "00111001" with the signaling parameters. In certain embodiments, all allowed guard intervals in the payload configurations are represented in the patterns of the preamble. Thus, the preamble and the payload may have the same guard interval.

In one embodiment, the patterns (32×7=224) may be coded using 8-bits. In other words, the FFT/GI/SPP parameters are not separated from the L1 mode signaling parameter. Using the 8-bits to represent all the patterns as shown in FIGS. 7A-7F.

FIGS. 7A-7F show a table for providing signaling patterns according to one embodiment. Table 700 shows the possible patterns. As shown in table 700, there are 32 unused patterns that may be used in future expansion of the system. For example, the unused patterns may be used for MIMO signaling. MIMO may have a higher number of allowable combinations for the payload and thus, a higher number of configurations for the preamble. FIG. 14B shows the structure of the last symbol in the bootstrap. The eight bits of the last symbol of the bootstrap are used to represent FFT/GI/SPP parameters and the L1 mode. In this embodiment, 32 patterns remain unused. In addition, the preamble and the payload may have the same guard interval.

In selected embodiments, the number of L1 modes that are used by the broadcasting system is equal to four combinations. Thus, the L1 modes that need to be signaled are equal to four.

FIG. 8 shows a table for providing signaling patterns according to one embodiment. When the L1 modes are signaled separately from the 32 allowable FFT/GI/SPP parameters, 2 bits are needed. The 32 allowable FFT/GI/SPP parameters are coded using five bits. Thus, in this embodiment, the total number of bits needed is 7 bits. Table 800 shows the possible patterns for the FFT/GI/SPP parameters. Table 802 shows the L1 modes patterns. FIG. 14C shows the structure of the last symbol in the bootstrap. In this example, the first five bits are used to signal FFT/GI/SPP parameters and the last two bits are used to signal the L1 mode. However, the L1 mode bits may appear first in other embodiments.

FIGS. 9A-9C show a table for providing signaling patterns according to one embodiment. In one embodiment, the FFT/GI/SPP and L1 parameters are not signaled individually and may be coded using the seven bits. Table 900 shows the possible patterns for the FFT/GI/SPP and L1 parameters. FIG. 14D shows the structure of the last symbol in the bootstrap. The seven bits of the last symbol of the bootstrap are used to represent FFT/GI/SPP parameters and the L1 mode.

In selected embodiments, the GI modes that may be used for each FFT size are reduced. For example, from the 32 combinations shown in Table 3, 16 may be selected for the preamble. For example, lower guard intervals may not be used. Further, the preamble guard interval and payload guard interval may be different in these embodiments. For example, the preamble may have a larger guard interval than the payload. In other embodiments, the preamble guard interval may be equal to the payload guard interval. Also, the preamble SPP and payload SPP may be different in these embodiments. The preamble may have a denser pilot pattern than the payload.

FIG. 10 shows two tables for providing signaling patterns according to one example. Table 1000 shows possible patterns for the FFT/GI/SPP parameters. The guard interval selected and shown in Table 1000 are exemplary. It is understood that other 16 guard interval combinations may be used. In one embodiment, the guard intervals 3072 and/or 3648 may be omitted to avoid the need to indicate both SP3 and SP8. For example, for each allowed FFT size a low and a high guard interval may be chosen. FIG. 14E shows the structure of the last symbol in the bootstrap. For example, the first four bits are used to signal FFT/GI/SPP parameters and the last three bits are used to signal the L1 mode. However, the L1 mode bits may appear first in other embodiments.

FIGS. 11A-11C show a table for providing signaling patterns according to one example. In one embodiment, the FFT/GI/SPP and L1 parameters are not signaled individually and may be coded using the seven bits. In one embodiment, the guard intervals 3072 and/or 3648 may be omitted to avoid the need indicate both SP3 and SP8. Table 1100 shows possible patterns for the FFT/GI/SPP and L1 parameters. FIG. 14F shows the structure of the last symbol in the bootstrap. The seven bits of the last symbol of the bootstrap are used to represent FFT/GI/SPP parameters and the L1 mode. Thus, the bootstrap provides the preamble configuration.

In one embodiment, $D_x$ may be set to a predetermined number. As shown in Table 1, $D_x$ may be a multiple of 3 or 4. Thus, $D_x$ may be set to 3 or 4. The higher density of pilots in the preamble helps in the estimation of the channel. The mobile and multipath performance is improved.

In selected embodiments, the guard interval information may be not needed by the receiver. For example, when the frame includes only one preamble symbol the receiver does not need to perform a guard interval correlation. Thus, in one embodiment, the preamble only has one symbol for the 32K mode. Thus, for the 32K mode, the GI information does not need to be signaled to the receiver. In this embodiment, the allowable combinations are then 25. The subset of predetermined combinations is then 175 for an L1 mode of 7. The allowable combinations may be signaled using 7 bits or 8 bits. The L1 mode may or may not be signaled separately from the FFT/GI/SPP parameters.

FIG. 12 shows tables for providing signaling patterns according to one example. Table 1200 shows a plurality of patterns according to one embodiment. As shown in Table 1200, the GI information is not signaled to the receiver for the 32K mode. As shown in the Table 1200, seven patterns remain unused and may be used for MIMO mode Table 1202 shows the patterns for L1 mode signaling. FIG. 14A shows the structure of the bootstrap symbol. However, the L1 mode bits may appear first in other embodiments. In other embodiments, the number of L1 mode may be four and thus the allowable configurations may be signaled to the receiver using 7-bits.

FIGS. 13A-13F show a table for providing signaling patterns according to one example. Table 1300 shows the possible patterns. In one embodiment, the FFT/GT/SPP and L1 parameters are not signaled individually and may be coded using the eight bits. In selected embodiments, the GI modes that may be used for each FFT size are reduced. Thus the allowable combinations may be further reduced from 25.

Figure 15:
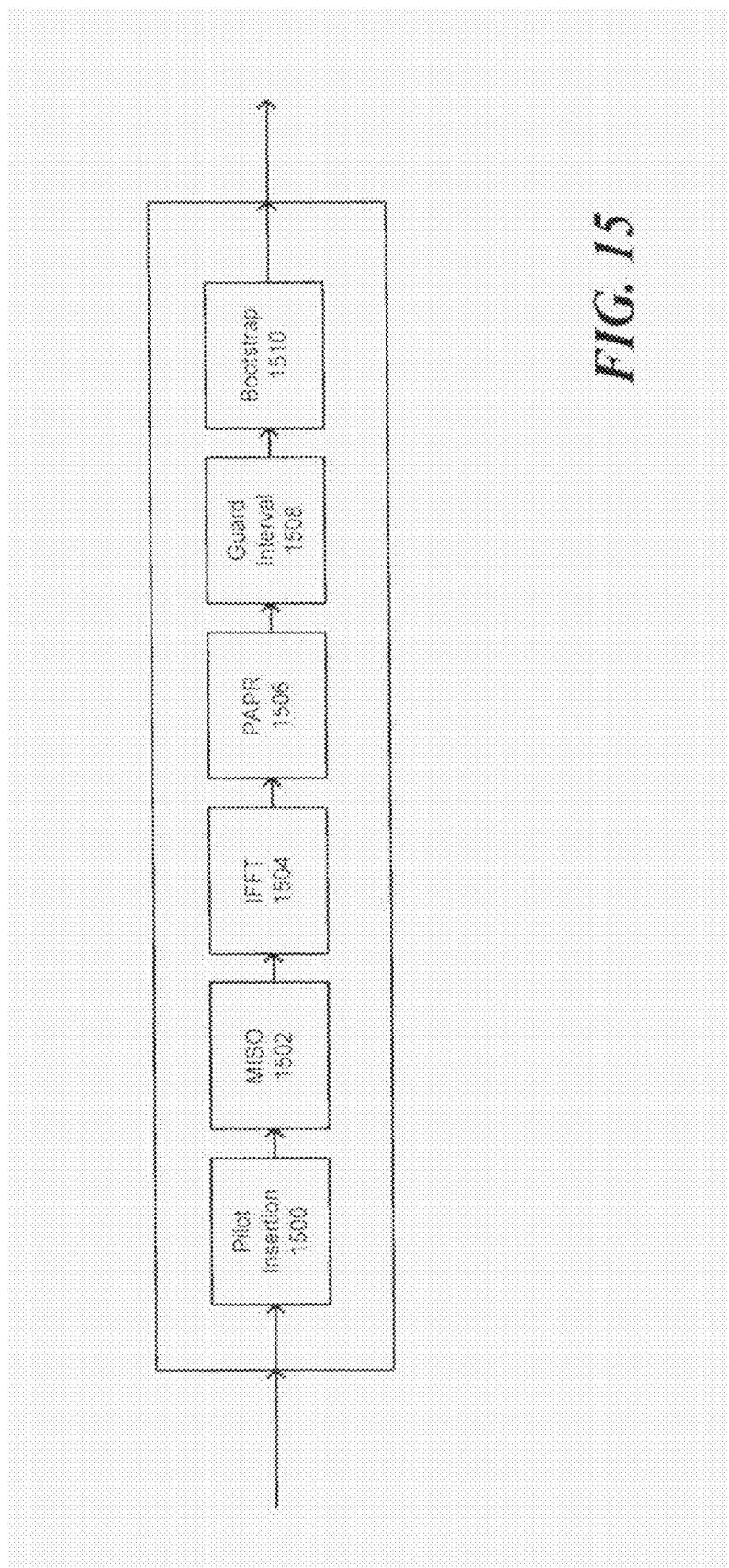
FIG. 15 is a schematic block diagram for wave generation according to one example.

FIG. 15 is a schematic block diagram that shows the waveform generation. As shown in FIG. 4. The bootstrap signal is prefixed to the front of each frame. The waveform generation may include the following modules that are implemented by one or a combination of programmable or hardwired circuitry. The pilot insertion module 1500 inserts the pilots as specified by the broadcaster. Then, the signal is passed to a multiple input single output (MISO) module 1502. The resultant signal is passed through an IFFT module 1504. Then, peak-to-average power reduction (PAPR) techniques can be applied by a PAPR module 1506. A guard interval module 1508 inserts a repeated portion of the COFDM waveform. The GI length may be chosen to match the level of multipath expected. Finally, a bootstrap module 1510 affixes the bootstrap to the front of each frame.

Figure 16:
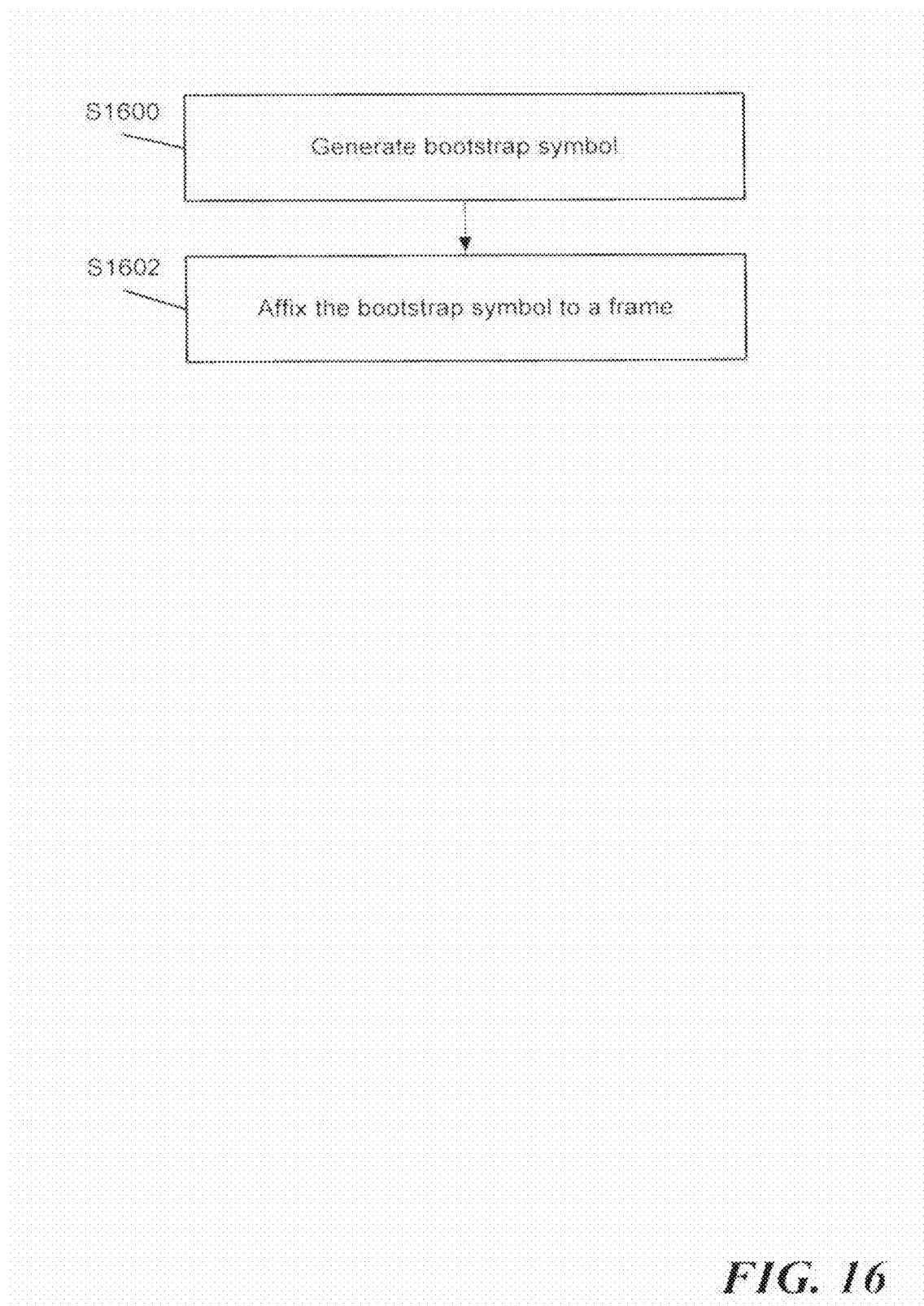
FIG. 16 is a flow chart that shows the signaling method according to one example.

FIG. 16 is a flow chart that shows the signaling method according to one example. At step S1600, a bootstrap symbol is generated by the transmitter 100 using processing circuitry. In one embodiment, the bootstrap symbol is generated by referencing a look-up table stored in the transmitter 100 to determine the pattern corresponding to the parameters of preamble as set by the broadcaster. In other embodiments, the look-up table is stored at a remote location or the signaling pattern is provided directly to the transmitter 100 by an operator. As explained in detail above, the look-up table includes a plurality of patterns that represent the preamble configuration. The plurality of patterns are allowable combinations of a modulation parameter, a FFT size, a guard interval, and a scattered pilot pattern (SPP). The plurality of patterns may be based on allowable payload configurations, and in certain embodiments represents a subset of the allowable payload configurations. The payload configurations are predetermined combinations of a modulation parameter, a FFT size, a guard interval, and a frequency domain displacement of SPP. At step S1602, the bootstrap symbol created at step S1600, in addition to other bootstrap symbols are affixed to the front of a frame. In selected embodiments, the bootstrap symbol created at S1600 is the last symbol of the bootstrap.

Figure 17:
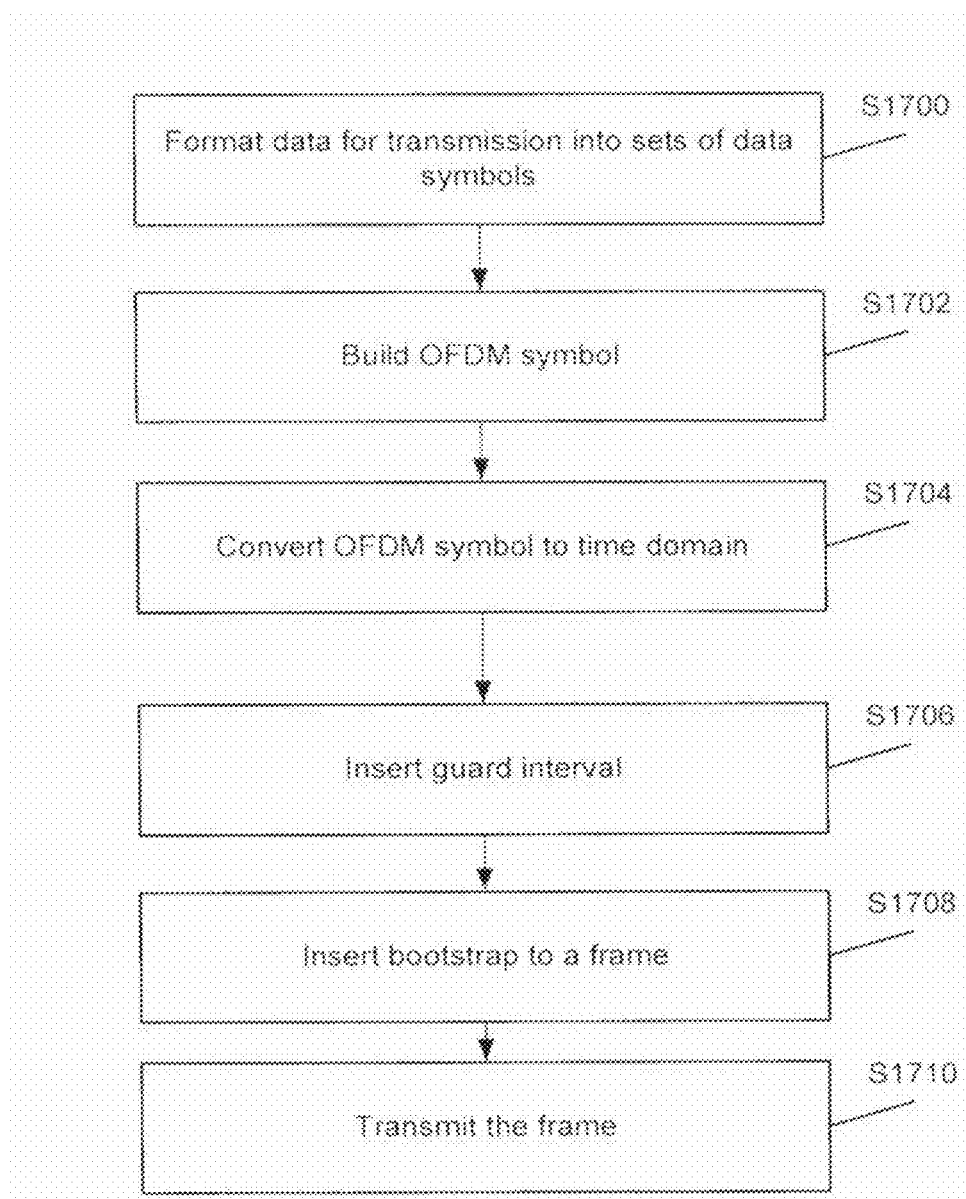
FIG. 17 is a flow chart that shows the operation of the transmitter according to one example.

FIG. 17 is a flow chart that shows the operation of the transmitter according to one example. At step S1700, the transmitter 100 forms sets of data symbols for each OFDM symbol. Each set of symbols may correspond to an amount of data which can be carried by an OFDM symbol. At step S1702, the transmitter 100 may combine the data symbols with pilot symbols. At step 1704, the transmitter 100 modulates the data to form OFDM symbols in the frequency domain. Then, the transmitter 100 performs an IFFT to transform the OFDM symbols from the frequency domain into the time domain. At step S1706, the transmitter 100 adds a guard interval by copying a part of the OFDM symbols. At step S1708, the transmitter 100 may generate one or more bootstrap symbols. As discussed above the bootstrap may be used for synchronization and indication of a version, and for indication of EAS information. In one embodiment, the transmitter 100, using the processing circuitry, may check whether the broadcaster has indicated a preamble configuration. In response to determining that the broadcaster has indicated a preamble configuration, the transmitter 100 uses at least one look-up table to determine the corresponding pattern. For example, the transmitter 100 may utilize more than one look-up table when preamble parameters (e.g., the L1 mode) are signaled separately. In response to determining that the broadcaster has not indicated a preamble configuration, a default preamble configuration may be used. The look-up table may also be associated with the version. Thus, a plurality of look-up tables may be stored in the memory of the transmitter or at a remote location. At step S1710, the frame is transmitted.

Figure 18:
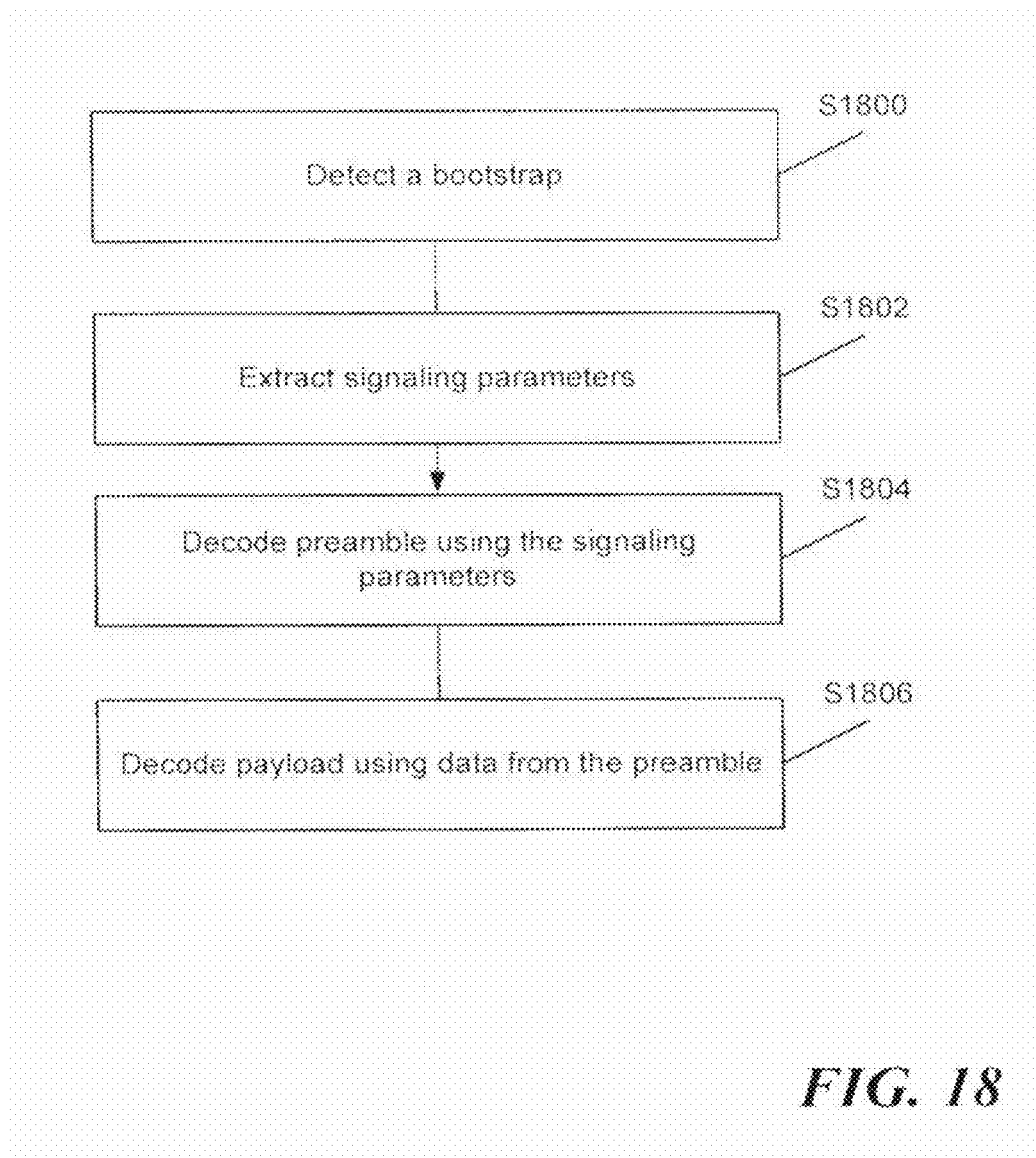
FIG. 18 is a flow chart that shows the operation of the receiver according to one example.

FIG. 18 is a flow chart that shows the operation of the receiver according to one example. At step S1800, the receiver 300 detects the bootstrap. The bootstrap is detected from a received digital television signal according to one embodiment. The receiver detects the bits (e.g., 7 or 8) in the last symbol of the bootstrap. At step S1802, the receiver 300 determines the signaling patterns by referencing at least one look-up table stored in the memory or a remote location (e.g., a predetermined server). For example, the transmitter 100 may utilize more than one look-up table when preamble parameters (e.g., the L1 mode) are signaled separately. In one embodiment, the broadcasting system may be using the patterns described in FIG. 7A. The receiver 300 detects the bits as "00000001" which is the second pattern in table 700. Then, the receiver 300 may use a look-up table stored in a memory to determine the corresponding signaling data. In this example, the signaling parameters are FFT size=8, GI=192, SPP=SP16_1 and the L1 mode=2. At step S1804, the receiver 300 decodes the preamble using the signaling parameters extracted at step S1802 to decode the preamble. At step S1806, the receiver 300 decodes the data payload using signaling information included in the preamble.

The receiver circuitry illustrated in FIG. 3 generally operates under control of at least one processor, such as a CPU, which is coupled to memory, program memory, and a graphics subsystem via one or more buses. An exemplary computer for controlling the receiver circuitry is further described below with respect to FIG. 21. Similarly, the transmission circuitry illustrated in FIG. 2 is operated under control of at least one processor.

Figure 19:
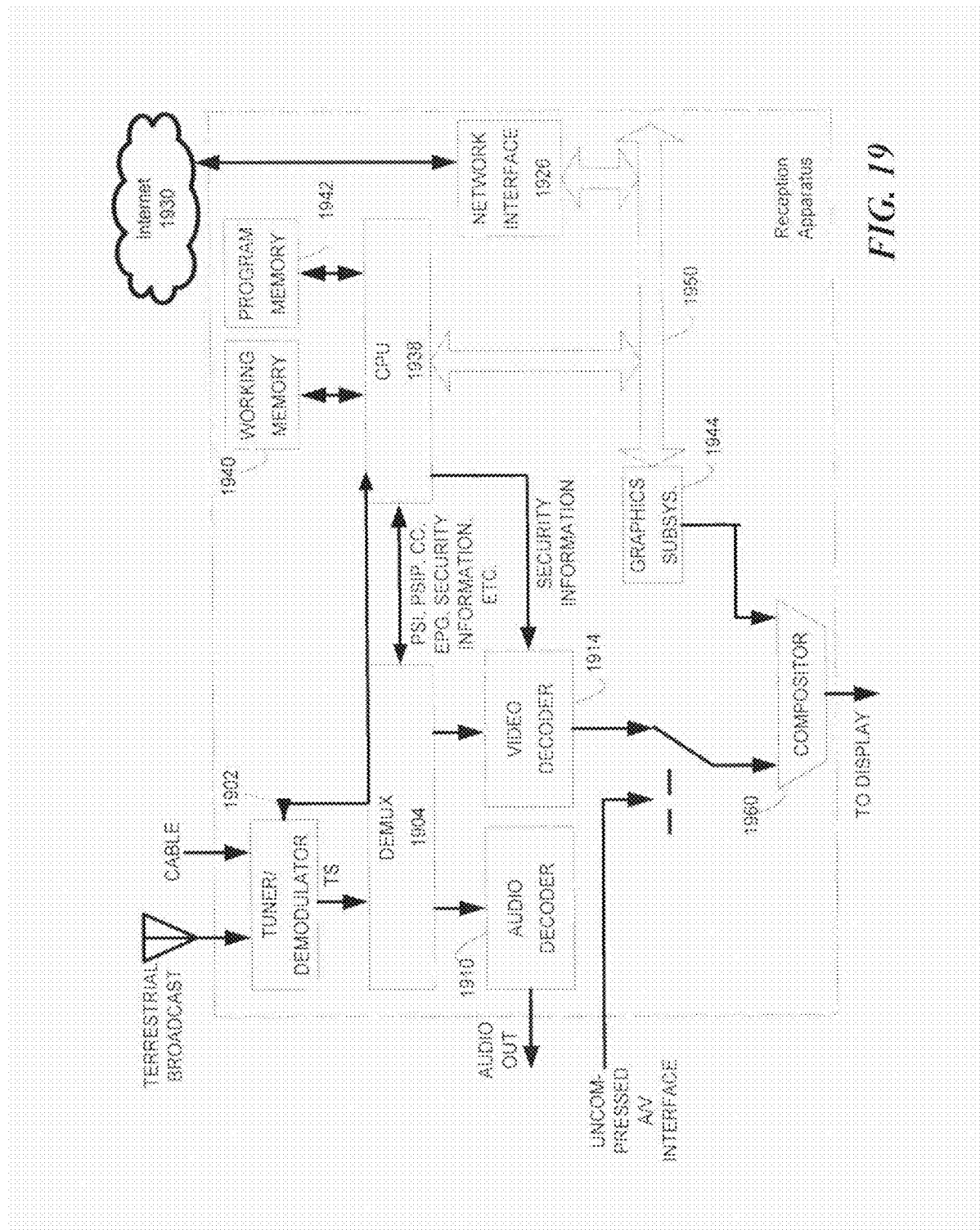
FIG. 19 illustrates an exemplary reception apparatus.

FIG. 19 illustrates an exemplary reception apparatus, which is configured to implement the process of FIG. 18 in certain embodiments. The reception apparatus includes a digital television receiver device that is incorporated into a fixed or mobile device such as a television set, a set top box, smartphone, tablet computer, laptop, portable computer, or any other device configured to receive television content. The reception apparatus may also be incorporated in a vehicle.

The reception apparatus includes a tuner/demodulator 1902, which receives digital television broadcast signals from one or more content sources (e.g., content source) via, for example, a terrestrial broadcast. The tuner/demodulator 1902 includes one of the receiver circuitry illustrated in FIG. 3 in certain embodiments. Depending on the embodiment, the reception apparatus may alternatively or additionally be configured to receive a cable television transmission or a satellite broadcast. The tuner/demodulator 1902 receives a signal, including for example an MPEG-2 TS or IP packets, which may be demultiplexed by the demultiplexer 1904 or handled by middleware and separated into audio and video (A/V) streams. The audio is decoded by an audio decoder 1910 and the video is decoded by a video decoder 1914. Further, uncompressed A/V data may be received via an uncompressed A/V interface (e.g., a HDMI interface), if available.

In one embodiment, the received signal (or stream) includes supplemental data such as one or a combination of closed caption data, a triggered declarative object (TDO), a trigger, a virtual channel table, EPG data, NRT content, etc. Examples of the TDO and trigger are described in ATSC Candidate Standard: Interactive Services Standard (A/105: 2014), S13-2-389r7, which is incorporated herein by reference in its entirety. The supplemental data are separated out by the demultiplexer 1904. However, the A/V content and/or the supplemental data may be received via the Internet 1930 and a network interface 1926.

A storage unit may be provided to store non real time content (NRT) or Internet-delivered content such as Internet Protocol Television (IPTV). The stored content can be played by demultiplexing the content stored in the storage unit by the demultiplexer 1904 in a manner similar to that of other sources of content. Alternatively, the stored content may be processed and presented to the user by the CPU 1938. The storage unit may also store any other supplemental data acquired by the reception apparatus.

The reception apparatus generally operates under control of at least one processor, such as the CPU 1938, which is coupled to a working memory 1940, program memory 1942, and a graphics subsystem 1944 via one or more buses (e.g., bus 1950). The CPU 1938 receives closed caption data from the demultiplexer 1904 as well as any other supplemental data used for rendering graphics, and passes appropriate instructions and data to the graphics subsystem 1944. The graphics outputted by the graphics subsystem 1944 are combined with video images by the compositor and video interface 1960 to produce an output suitable for display on a video display.

Further, the CPU 1938 operates to carry out functions of the reception apparatus including the processing of NRT content, triggers, TDOs, EPG data, etc. For example, the CPU 1938 operates to execute script objects (control objects) contained in the TDO, its trigger(s), etc., using for example a Declarative Object (DO) Engine stored in the program memory 1942.

Figure 20:
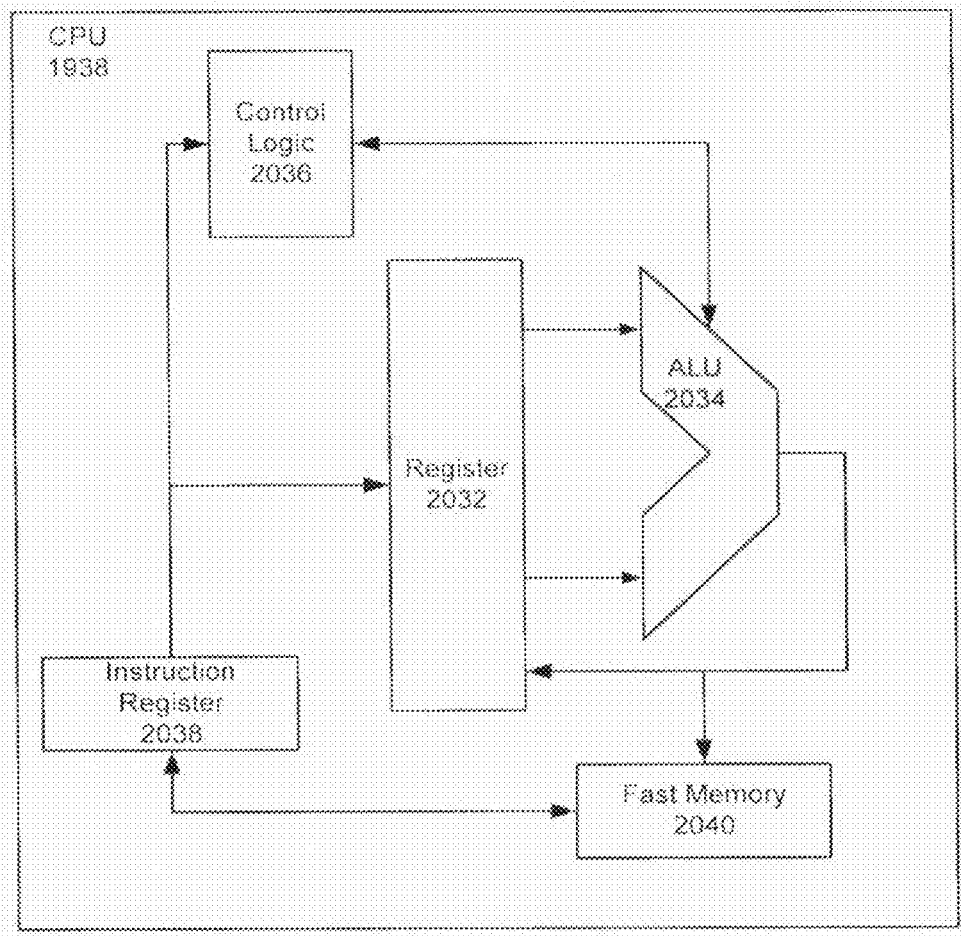
FIG. 20 is an exemplary block diagram of a central processing unit according to one example.

Although not illustrated in FIG. 19, the CPU 1938 may be coupled to any one or a combination of the reception apparatus resources to centralize control of one or more functions. In one embodiment, the CPU 1938 also operates to oversee control of the reception apparatus including the tuner/demodulator 1902 and other television resources. For example, FIG. 20 shows one implementation of CPU 1938. Depending on the embodiment, the working memory 1940 may store any of the tables described in the present disclosure such as table 700, table 800, table 802, table 900, table 1000, table 1002, table 1100, table 1200, table 1202 and/or 1300.

FIG. 20 illustrates one implementation of CPU 1938, in which the instruction register 2038 retrieves instructions from the fast memory 2040. At least part of these instructions are fetched from the instruction register 2038 by the control logic 2036 and interpreted according to the instruction set architecture of the CPU 1938. Part of the instructions can also be directed to the register 2032. In one implementation, the instructions are decoded according to a hardwired method, and in another implementation, the instructions are decoded according a microprogram that translates instructions into sets of CPU configuration signals that are applied sequentially over multiple clock pulses. After fetching and decoding the instructions, the instructions are executed using the arithmetic logic unit (ALU) 2034 that loads values from the register 2032 and performs logical and mathematical operations on the loaded values according to the instructions. The results from these operations can be feedback into the register and/or stored in the fast memory 2040. According to certain implementations, the instruction set architecture of the CPU 1938 can use a reduced instruction set architecture, a complex instruction set architecture, a vector processor architecture, a very large instruction word architecture. Furthermore, the CPU 1938 can be based on the Von Neuman model or the Harvard model. The CPU 1938 can be a digital signal processor, an FPGA, an ASIC, a PLA, a PLD, or a CPLD. Further, the CPU 1938 can be an x86 processor by Intel or by AMD; an ARM processor, a Power architecture processor by, e.g., IBM; a SPARC architecture processor by Sun Microsystems or by Oracle; or other known CPU architecture.

Figure 21:
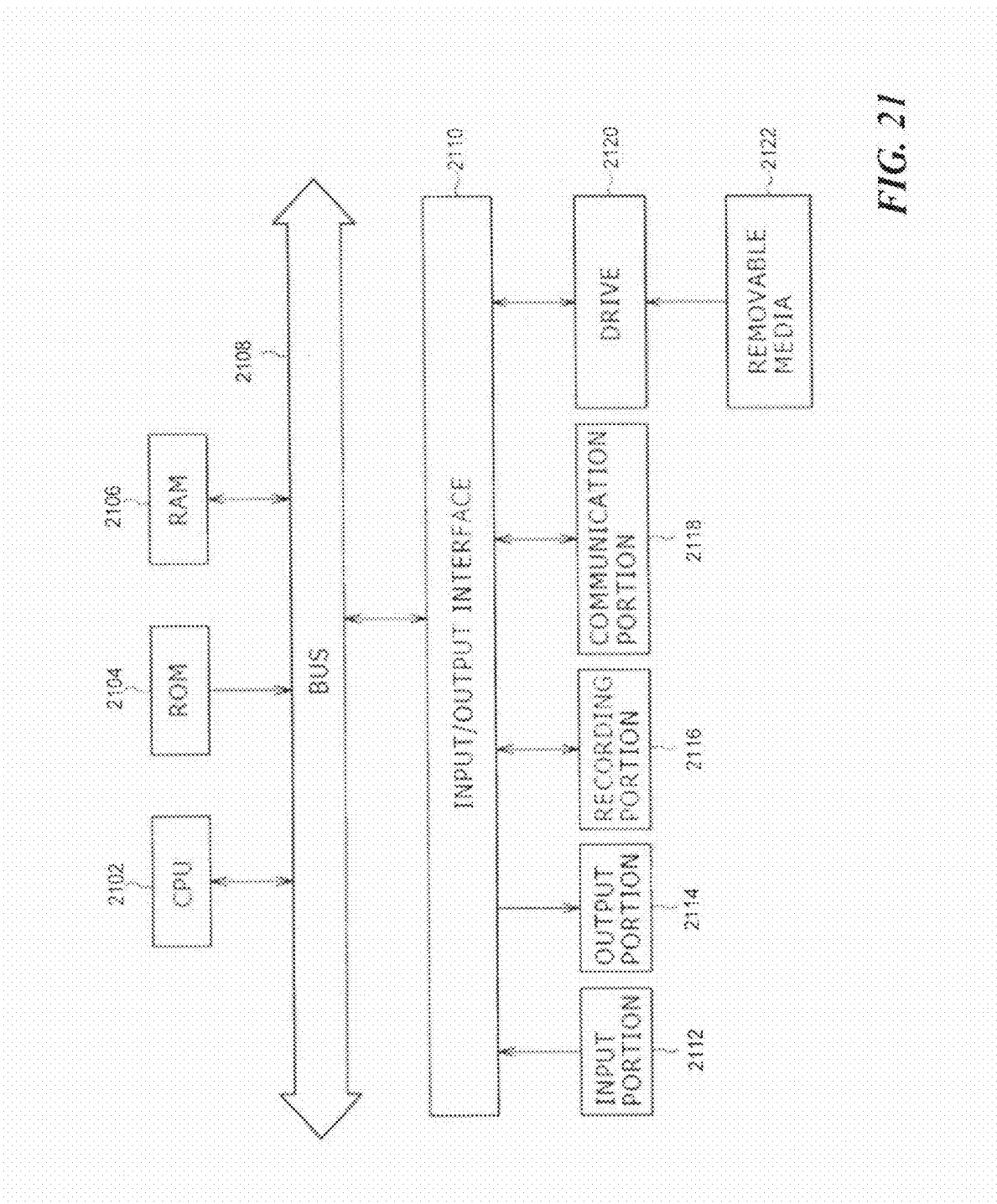
FIG. 21 is a block diagram showing an example of a hardware configuration of a computer.

FIG. 21 is a block diagram showing an example of a hardware configuration of a computer that can be configured to perform functions of any one or a combination of reception apparatus and transmission apparatus. For example, in one embodiment, the computer is configured to perform the functions in the digital domain, such as the modulator 206, channel encoder 204, demodulator 310, and/or bootstrap module 1510, the transmitter 100, the receiver 300, or the reception apparatus illustrated in FIG. 19.

As illustrated in FIG. 21 the computer includes a central processing unit (CPU) 2102, read only memory (ROM) 2104, and a random access memory (RAM) 2106 interconnected to each other via one or more buses 2108. The one or more buses 2108 are further connected with an input-output interface 2110. The input-output interface 2110 is connected with an input portion 2112 formed by a keyboard, a mouse, a microphone, remote controller, etc. The input-output interface 2110 is also connected an output portion 2114 formed by an audio interface, video interface, display, speaker and the like; a recording portion 2116 formed by a hard disk, a non-volatile memory or other non-transitory computer readable storage medium; a communication portion 2118 formed by a network interface, modem, USB interface, fire wire interface, etc.; and a drive 2120 for driving removable media 2122 such as a magnetic disk, an optical disk, a magneto-optical disk, a semiconductor memory, etc.

According to one embodiment, the CPU 2102 loads a program stored in the recording portion 2116 into the RAM 2106 via the input-output interface 2110 and the bus 2108, and then executes a program configured to provide the functionality of the one or combination of the content source, the reception apparatus, and the transmission apparatus.

The hardware description above, exemplified by any one of the structure examples shown in FIGS. 20 and 21, constitutes or includes specialized corresponding structure that is programmed or configured to perform the algorithm shown in FIGS. 16, 17 and 18. For example, the algorithm shown in FIG. 16 may be completely performed by the circuitry included in the single device shown in FIG. 21.

Obviously, numerous modifications and variations are possible in light of the above teachings. It is therefore to be understood that within the scope of the appended claims, the invention may be practiced otherwise than as specifically described herein. For example, any of the different methods described above may be combined with one or a combination of the other different methods to reduce the number of bits required to signal parameters.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The above disclosure also encompasses the embodiments noted below.

(1) A method for signaling parameters of a preamble, the method includes generating, using processing circuitry of a transmission apparatus, a bootstrap symbol based on the parameters of the preamble; and prefixing, using the processing circuitry, the bootstrap symbol to a frame that includes the preamble, in which the bootstrap symbol is selected from a plurality of patterns, and the plurality of patterns represent at least a subset of predetermined combinations of the parameters of the preamble including an FFT (Fast Fourier Transform) size, a guard interval, a frequency domain displacement component of a SPP (Scattered Pilot Pattern) and a L1 mode.

(2) The method of feature (1), in which a time domain displacement component of the SPP for each of the subset of predetermined combinations is equal to one or another predetermined number.

(3) The method of feature (1) or (2), in which for each combination of the FFT size and the guard interval having a plurality of frequency domain displacement component values of the SPP that are multiples of each other in the predetermined combinations of the parameters of the preamble, the subset of the predetermined combinations only includes the lowest of the plurality of frequency domain displacement component values of the SPP for the respective combination of the FFT size and the guard interval.

(4) The method of any one of features (1) to (3), in which the FFT size, the guard interval and the SPP are signaled using a first subset of a predetermined number of bits and the L1 mode is signaled using a second subset of the predetermined number of bits.

(5) The method of any one of features (1) to (4), in which the FFT size of at least a first one of the plurality of patterns is 8K, the FFT size of at least a second one of the plurality of patterns is 16K, and the FFT size of at least a third one of the plurality of patterns is 32K.

(6). The method of any one of features (1) to (5), in which when a preamble only includes one symbol for a predetermined FFT size of the predetermined combinations, the plurality of patterns further represent at least one combination of the predetermined FFT size and the frequency domain displacement component of the SPP that is not associated with a particular guard interval.

(7) The method of any one of features (1) to (6), in which the frequency domain displacement in the predetermined combinations is predefined.

(8) The method of any one of features (1) to (7), in which the bootstrap symbol has a predetermined number of seven or eight bits.

(9) The method of any one of features (1) to (8), in which the number of L1 modes is four.

(10) The method of any one of features (1) to (9), in which the FFT size, the guard interval, and the frequency domain displacement component of the SPP in the subset of predetermined combinations are:

| Guard interval (samples) | 8K FFT | 16K FFT | 32K FFT |
| --- | --- | --- | --- |
| 192 | SP16_1 | SP32_1 | SP32_1 |
| 384 | SP8_1 | SP16_1 | SP32_1 |
| 512 | SP6_1 | SP12_1 | SP24_1 |
| 768 | SP4_1 | SP8_1 | SP16_1 |
| 1024 | SP3_1 | SP6_1 | SP12_1 |
| 1536 | SP4_1 | SP4_1 | SP8_1 |
| 2048 | SP3_1 | SP3_1 | SP6_1 |
| 2432 | NA | SP3_1 | SP6_1 |
| 3072 | NA | SP4_1 | SP3_1, SP8_1 |
| 3648 | NA | SP4_1 | SP3_1, SP8_1 |
| 4096 | NA | SP3_1 | SP3_1 |
| 4864 | NA | NA | SP3_1 |

(11) The method of any one of features (1) to (10), in which the FFT size, the guard interval, and the frequency domain displacement component combinations in the predetermined combinations are

| Guard interval (Samples) | 8K FFT | 16K FFT | 32K FFT |
| --- | --- | --- | --- |
| 192 | 32, 16 | 32 | 32 |
| 384 | 16, 8 | 32, 16 | 32 |
| 512 | 12, 6 | 24, 12 | 24 |
| 768 | 8, 4 | 16, 8 | 32, 16 |
| 1024 | 6, 3 | 12, 6 | 24, 12 |
| 1536 | 4 | 8, 4 | 16, 8 |
| 2048 | 3 | 6, 3 | 12, 6 |
| 2432 | NA | 6, 3 | 12, 6 |
| 3072 | NA | 4 | 8, 3 |
| 3648 | NA | 4 | 8, 3 |
| 4096 | NA | 3 | 6, 3 |
| 4864 | NA | NA | 6, 3 |

(12) The method of any one of features (1) to (11), in which the predetermined combinations includes at least one combination for each of a plurality of guard intervals, and at least one combination for each of the plurality of guard intervals is included in the subset of predetermined combinations.

(13) A transmission apparatus, including a memory, and circuitry configured to generate a bootstrap symbol based on signaling parameters of a preamble; and prefix the bootstrap symbol to a frame that includes the preamble, in which the bootstrap symbol is selected from a plurality of patterns, and the plurality of patterns represent at least a subset of predetermined combinations of the parameters of the preamble including a FFT (Fast Fourier Transform) size, a guard interval, a frequency domain displacement component of a SPP (Scattered Pilot Pattern) and a L1 mode.

(14) The transmission apparatus of feature (13), in which a time domain displacement component of the SPP for each of the subset of predetermined combinations is equal to one or another predetermined number.

(15) The transmission apparatus of feature (13) or (14), in which for each combination of the FFT size and the guard interval having a plurality of frequency domain displacement component values of the SPP that are multiples of each other in the predetermined combinations of the parameters of the preamble, the subset of the predetermined combinations only includes the lowest of the plurality of frequency domain displacement component values of the SPP for the respective combination of the FFT size and the guard interval.

(16) The transmission apparatus of any one of features (13) to (15), in which the FFT size, the guard interval and the SPP are signaled using a first subset of a predetermined number of bits and the L1 mode is signaled using a second subset of the predetermined number of bits.

(17) The transmission apparatus of any one of features (13) to (16), in which the FFT size of at least a first one of the plurality of patterns is 8K, the FFT size of at least a second one of the plurality of patterns is 16K, and the FFT size of at least a third one of the plurality of patterns is 32K.

(18). The transmission apparatus of any one of features (13) to (17), in which when a preamble only includes one symbol for a predetermined FFT size of the predetermined combinations, the plurality of patterns further represent at least one combination of the predetermined FFT size and the frequency domain displacement component of the SPP that is not associated with a particular guard interval.

(19) The transmission apparatus of any one of features (13) to (18), in which the frequency domain displacement in the predetermined combinations is predefined.

(20) The transmission apparatus of any one of features (13) to (19), in which the bootstrap symbol has a predetermined number of seven or eight bits.

(21) The transmission apparatus of any one of features (13) to (20), in which the number of L1 modes is four.

(22) The transmission apparatus of any one of features (13) to (21), in which the FFT size, the guard interval, and the frequency domain displacement component of the SPP in the subset of predetermined combinations are:

| Guard interval (samples) | 8K FFT | 16K FFT | 32K FFT |
|---|---|---|---|
| 192 | SP16_1 | SP32_1 | SP32_1 |
| 384 | SP8_1 | SP16_1 | SP32_1 |
| 512 | SP6_1 | SP12_1 | SP24_1 |
| 768 | SP4_1 | SP8_1 | SP16_1 |
| 1024 | SP3_1 | SP6_1 | SP12_1 |
| 1536 | SP4_1 | SP4_1 | SP8_1 |
| 2048 | SP3_1 | SP3_1 | SP6_1 |
| 2432 | NA | SP3_1 | SP6_1 |
| 3072 | NA | SP4_1 | SP3_1, SP8_1 |
| 3648 | NA | SP4_1 | SP3_1, SP8_1 |
| 4096 | NA | SP3_1 | SP3_1 |
| 4864 | NA | NA | SP3_1 |

(23) The transmission apparatus of any one of features (13) to (22), in which the FFT size, the guard interval, and the frequency domain displacement component combinations in the predetermined combinations are

| Guard interval (Samples) | 8K FFT | 16K FFT | 32K FFT |
|---|---|---|---|
| 192 | 32, 16 | 32 | 32 |
| 384 | 16, 8 | 32, 16 | 32 |
| 512 | 12, 6 | 24, 12 | 24 |
| 768 | 8, 4 | 16, 8 | 32, 16 |
| 1024 | 6, 3 | 12, 6 | 24, 12 |
| 1536 | 4 | 8, 4 | 16, 8 |
| 2048 | 3 | 6, 3 | 12, 6 |
| 2432 | NA | 6, 3 | 12, 6 |
| 3072 | NA | 4 | 8, 3 |
| 3648 | NA | 4 | 8, 3 |
| 4096 | NA | 3 | 6, 3 |
| 4864 | NA | NA | 6, 3 |

(24) The transmission apparatus of any one of features (13) to (23), in which the predetermined combinations includes at least one combination for each of a plurality of guard intervals, and at least one combination for each of the plurality of guard intervals is included in the subset of predetermined combinations.

(25) A method for decoding a preamble of a frame, the method including detecting, using processing circuitry of a reception apparatus, a bootstrap symbol; and extracting, using the processing circuitry, signaling parameters of the preamble from the bootstrap symbol by referencing at least one look up table stored in a memory, in which the at least one look-up table includes a plurality of patterns representing at least a subset of predetermined combinations of the parameters of the preamble including an FFT (Fast Fourier Transform) size, a guard interval, a frequency domain displacement component of a SPP (Scattered Pilot Pattern) and a L1 mode.

(26) The method of feature (25), further including decoding, using the processing circuitry, the preamble based on the extracted signaling parameters to obtain signaling data of a payload of the frame, and decoding the payload using the signaling data of the payload.

(27) The method of feature (25) or (26), in which a time domain displacement component of the SPP for each of the subset of predetermined combinations is equal to one or another predetermined number.

(28) The method of any one of features (25) to (27), in which for each combination of the FFT size and the guard interval having a plurality of frequency domain displacement component values of the SPP that are multiples of each other in the predetermined combinations of the parameters of the preamble, the subset of the predetermined combinations only includes the lowest of the plurality of frequency domain displacement component values of the SPP for the respective combination of the FFT size and the guard interval.

(29). The method of any one of features (25) to (28), in which the FFT size, the guard interval and the SPP are signaled using a first subset of a predetermined number of bits and the L1 mode is signaled using a second subset of the predetermined number of bits.

(30) The method of any one of features (25) to (29), in which the FFT size of at least a first one of the plurality of patterns is 8K, the FFT size of at least a second one of the plurality of patterns is 16K, and the FFT size of at least a third one of the plurality of patterns is 32K.

(31) The method of any one of features (25) to (30), in which when a preamble only includes one symbol for a predetermined FFT size of the predetermined combinations, the plurality of patterns further represent at least one combination of the predetermined FFT size and the frequency domain displacement component of the SPP that is not associated with a particular guard interval.

(32) The method of any one of features (25) to (31), in which the frequency domain displacement in the predetermined combinations is predefined.

(33) The method of any one of features (25) to (32), in which the bootstrap symbol has a predetermined number of seven or eight bits.

(34) The method of any one of features (25) to (33), in which the number of L1 modes is four.

(35) The method of any one of features (25) to (34), in which the FFT size, the guard interval, and the frequency domain displacement component of the SPP in the subset of predetermined combinations are:

| Guard interval (samples) | 8K FFT | 16K FFT | 32K FFT |
| --- | --- | --- | --- |
| 192 | SP16_1 | SP32_1 | SP32_1 |
| 384 | SP8_1 | SP16_1 | SP32_1 |
| 512 | SP6_1 | SP12_1 | SP24_1 |
| 768 | SP4_1 | SP8_1 | SP16_1 |
| 1024 | SP3_1 | SP6_1 | SP12_1 |
| 1536 | SP4_1 | SP4_1 | SP8_1 |
| 2048 | SP3_1 | SP3_1 | SP6_1 |
| 2432 | NA | SP3_1 | SP6_1 |
| 3072 | NA | SP4_1 | SP3_1, SP8_1 |
| 3648 | NA | SP4_1 | SP3_1, SP8_1 |
| 4096 | NA | SP3_1 | SP3_1 |
| 4864 | NA | NA | SP3_1 |

(36) The method of any one of features (25) to (35), in which the FFT size, the guard interval, and the frequency domain displacement component combinations in the predetermined combinations are

| Guard interval (Samples) | 8K FFT | 16K FFT | 32K FFT |
| --- | --- | --- | --- |
| 192 | 32, 16 | 32 | 32 |
| 384 | 16, 8 | 32, 16 | 32 |
| 512 | 12, 6 | 24, 12 | 24 |
| 768 | 8, 4 | 16, 8 | 32, 16 |
| 1024 | 6, 3 | 12, 6 | 24, 12 |
| 1536 | 4 | 8, 4 | 16, 8 |
| 2048 | 3 | 6, 3 | 12, 6 |
| 2432 | NA | 6, 3 | 12, 6 |
| 3072 | NA | 4 | 8, 3 |
| 3648 | NA | 4 | 8, 3 |
| 4096 | NA | 3 | 6, 3 |
| 4864 | NA | NA | 6, 3 |

(37) The method of any one of features (25) to (36), in which the predetermined combinations includes at least one combination for each of a plurality of guard intervals, and at least one combination for each of the plurality of guard intervals is included in the subset of predetermined combinations.

(38) A reception apparatus, including a memory; and circuitry configured to detect a bootstrap symbol, extract signaling parameters of a preamble of a frame from the bootstrap symbol by referencing at least one look-up table stored in the memory, in which the at least one look-up table includes a plurality of patterns representing at least a subset of predetermined combinations of the parameters of the preamble including an FFT (Fast Fourier Transform) size, a guard interval, a frequency domain displacement component of a SPP (Scattered Pilot Pattern) and a L1 mode.

(39) The reception apparatus of feature (38), in which the circuitry is further configured to: decode the preamble based on the extracted signaling parameters to obtain signaling data of a payload of the frame, and decode the payload using the signaling data of the payload.

(40) The reception apparatus of feature (38) or (39), in which a time domain displacement component of the SPP for each of the subset of predetermined combinations is equal to one or another predetermined number.

(41) The reception apparatus of any one of features (38) to (40), in which for each combination of the FFT size and the guard interval having a plurality of frequency domain displacement component values of the SPP that are multiples of each other in the predetermined combinations of the parameters of the preamble, the subset of the predetermined combinations only includes the lowest of the plurality of frequency domain displacement component values of the SPP for the respective combination of the FFT size and the guard interval.

(42) The reception apparatus of any one of features (38) to (41), in which the FFT size, the guard interval and the SPP are signaled using a first subset of a predetermined number of bits and the L1 mode is signaled using a second subset of the predetermined number of bits.

(43) The reception apparatus of any one of features (38) to (42), in which the FFT size of at least a first one of the plurality of patterns is 8K, the FFT size of at least a second one of the plurality of patterns is 16K, and the FFT size of at least a third one of the plurality of patterns is 32K.

(44) The reception apparatus of any one of features (38) to (43), in which when a preamble only includes one symbol for a predetermined FFT size of the predetermined combinations, the plurality of patterns further represent at least one combination of the predetermined FFT size and the frequency domain displacement component of the SPP that is not associated with a particular guard interval.

(45) The reception apparatus any one of features (38) to (44), in which the frequency domain displacement in the predetermined combinations is predefined.

(46) The reception apparatus any one of features (38) to (45), in which the bootstrap symbol has a predetermined number of seven or eight bits.

(47) The reception apparatus of any one of features (38) to (46), in which the number of L1 modes is four.

(48) The reception apparatus any one of features (38) to (47), in which the FFT size, the guard interval, and the frequency domain displacement component of the SPP in the subset of predetermined combinations are:

| Guard interval (samples) | 8K FFT | 16K FFT | 32K FFT |
| --- | --- | --- | --- |
| 192 | SP16_1 | SP32_1 | SP32_1 |
| 384 | SP8_1 | SP16_1 | SP32_1 |
| 512 | SP6_1 | SP12_1 | SP24_1 |
| 768 | SP4_1 | SP8_1 | SP16_1 |
| 1024 | SP3_1 | SP6_1 | SP12_1 |
| 1536 | SP4_1 | SP4_1 | SP8_1 |
| 2048 | SP3_1 | SP3_1 | SP6_1 |
| 2432 | NA | SP3_1 | SP6_1 |
| 3072 | NA | SP4_1 | SP3_1, SP8_1 |
| 3648 | NA | SP4_1 | SP3_1, SP8_1 |
| 4096 | NA | SP3_1 | SP3_1 |
| 4864 | NA | NA | SP3_1 |

(49) The reception apparatus any one of features (38) to (48), in which the FFT size, the guard interval, and the frequency domain displacement component combinations in the predetermined combinations are

| Guard interval (Samples) | 8K FFT | 16K FFT | 32K FFT |
| --- | --- | --- | --- |
| 192 | 32, 16 | 32 | 32 |
| 384 | 16, 8 | 32, 16 | 32 |
| 512 | 12, 6 | 24, 12 | 24 |
| 768 | 8, 4 | 16, 8 | 32, 16 |
| 1024 | 6, 3 | 12, 6 | 24, 12 |
| 1536 | 4 | 8, 4 | 16, 8 |
| 2048 | 3 | 6, 3 | 12, 6 |
| 2432 | NA | 6, 3 | 12, 6 |
| 3072 | NA | 4 | 8, 3 |

-continued

| Guard interval (Samples) | 8K FFT | 16K FFT | 32K FFT |
|---|---|---|---|
| 3648 | NA | 4 | 8, 3 |
| 4096 | NA | 3 | 6, 3 |
| 4864 | NA | NA | 6, 3 |

(50) The reception apparatus any one of features (38) to (49), wherein the predetermined combinations includes at least one combination for each of a plurality of guard intervals, and at least one combination for each of the plurality of guard intervals is included in the subset of predetermined combinations.

(51) A non-transitory computer-readable medium storing instructions, which when executed by a computer, causes the computer to perform the method of any one of features (1) to (12).

(52) A non-transitory computer-readable medium storing instructions, which when executed by a computer, causes the computer to perform the method of any one of features (25) to (37).

The invention claimed is:

1. A method for signaling parameters of a preamble, the method comprising:
generating, by processing circuitry of a transmission apparatus, a bootstrap symbol based on one of a plurality of different predetermined combinations of the parameters of the preamble; and
prefixing, by the processing circuitry, the bootstrap symbol to a frame that includes the preamble, wherein
the bootstrap symbol indicates a single 8-bit value of a plurality of 8-bit values, the single 8-bit value being associated with the one of the plurality of different predetermined combinations of the parameters of the preamble,
each of the plurality of different predetermined combinations is associated with a different one of the plurality of 8-bit values, and
the parameters of the preamble include an FFT (Fast Fourier Transform) size, a guard interval length, a frequency domain displacement component of a SPP (Scattered Pilot Pattern) and a L1 mode.

2. The method of claim 1, wherein a time domain displacement component of the SPP for each of the different predetermined combinations is equal to one.

3. The method of claim 1, wherein the FFT size indicated by at least a first one of the plurality of 8-bit values is 8K, the FFT size indicated by at least a second one of the plurality of 8-bit values is 16K, and the FFT size indicated by at least a third one of the plurality of 8-bit values is 32K.

4. The method of claim 1, wherein the plurality of different predetermined combinations includes frequency domain displacements of 8 and 16.

5. The method of claim 1, wherein the bootstrap symbol has a predetermined number of eight bits.

6. The method of claim 1, wherein the different predetermined combinations of FFT size, the guard interval length, and the frequency domain displacement component of the SPP associated with the plurality of predetermined values are:

| Guard interval length (samples) | 8K FFT | 16K FFT | 32K FFT |
|---|---|---|---|
| 192 | SP16_1 | SP32_1 | SP32_1 |
| 384 | SP8_1 | SP16_1 | SP32_1 |
| 512 | SP6_1 | SP12_1 | SP24_1 |
| 768 | SP4_1 | SP8_1 | SP16_1 |
| 1024 | SP3_1 | SP6_1 | SP12_1 |
| 1536 | SP4_1 | SP4_1 | SP8_1 |
| 2048 | SP3_1 | SP3_1 | SP6_1 |
| 2432 | NA | SP3_1 | SP6_1 |
| 3072 | NA | SP4_1 | SP3_1, SP8_1 |
| 3648 | NA | SP4_1 | SP3_1, SP8_1 |
| 4096 | NA | SP3_1 | SP3_1 |
| 4864 | NA | NA | SP3_1. |

7. The method of claim 1, wherein the different predetermined combinations include at least one combination for each of a plurality of guard intervals.

8. A transmission apparatus, comprising:
a memory, and
circuitry configured to
generate a bootstrap symbol based on one of a plurality of different predetermined combinations of parameters of a preamble; and
prefix the bootstrap symbol to a frame that includes the preamble, wherein
the bootstrap symbol indicates a single 8-bit value of a plurality of 8-bit values, the single 8-bit value being associated with the one of the plurality of different combinations of the parameters of the preamble,
each of the plurality of different predetermined combinations is associated with a different one of the plurality of 8-bit values, and
the parameters of the preamble include an FFT (Fast Fourier Transform) size, a guard interval length, a frequency domain displacement component of a SPP (Scattered Pilot Pattern) and a L1 mode.

9. A method for decoding a preamble of a frame, the method comprising:
detecting, by processing circuitry of a reception apparatus, a bootstrap symbol; and
determining, by the processing circuitry, one of a plurality of different predetermined combinations of parameters of the preamble based on which one of a plurality of 8-bit values is indicated by the bootstrap symbol, wherein
each of the plurality of different predetermined combinations is associated with a different one of the plurality of 8-bit values, and
the parameters include an FFT (Fast Fourier Transform) size, a guard interval length, a frequency domain displacement component of a SPP (Scattered Pilot Pattern) and a L1 mode.

10. The method of claim 9, further comprising:
decoding, by the processing circuitry, the preamble based on the determined one of the plurality of different predetermined combinations of the parameters to obtain signaling data of a payload of the frame, and
decoding the payload using the signaling data of the payload.

11. The method of claim 9, wherein a time domain displacement component of the SPP for each of the different predetermined combinations is equal to one.

12. The method of claim 9, wherein the FFT size indicated by at least a first one of the plurality of 8-bit values is 8K, the FFT size indicated by at least a second one of the plurality of 8-bit values is 16K, and the FFT size indicated by at least a third one of the plurality of 8-bit values is 32K.

13. The method of claim 9, wherein the plurality of different predetermined combinations includes frequency domain displacements of 8 and 16.

14. The method of claim 9, wherein the bootstrap symbol has a predetermined number of eight bits.

15. The method of claim 9, wherein the different predetermined combinations of the FFT size, the guard interval length, and the frequency domain displacement component of the SPP associated with the plurality of predetermined values are:

| Guard interval length (samples) | 8K FFT | 16K FFT | 32K FFT |
|---|---|---|---|
| 192 | SP16_1 | SP32_1 | SP32_1 |
| 384 | SP8_1 | SP16_1 | SP32_1 |
| 512 | SP6_1 | SP12_1 | SP24_1 |
| 768 | SP4_1 | SP8_1 | SP16_1 |
| 1024 | SP3_1 | SP6_1 | SP12_1 |
| 1536 | SP4_1 | SP4_1 | SP8_1 |
| 2048 | SP3_1 | SP3_1 | SP6_1 |
| 2432 | NA | SP3_1 | SP6_1 |
| 3072 | NA | SP4_1 | SP3_1, SP8_1 |
| 3648 | NA | SP4_1 | SP3_1, SP8_1 |
| 4096 | NA | SP3_1 | SP3_1 |
| 4864 | NA | NA | SP3_1. |

16. The method of claim 9, wherein the different predetermined combinations include at least one combination for each of a plurality of guard intervals.

17. A reception apparatus, comprising:
a memory, and
circuitry configured to
detect a bootstrap symbol,
determine one of a plurality of different predetermined combinations of parameters of a preamble of a frame based on which one of a plurality of 8-bit values is indicated by the bootstrap symbol, wherein
each of the plurality of different predetermined combinations is associated with a different one of the plurality of 8-bit values, and
the parameters include an FFT (Fast Fourier Transform) size, a guard interval length, a frequency domain displacement component of a SPP (Scattered Pilot Pattern) and a L1 mode.

18. The reception apparatus of claim 17, wherein the circuitry is further configured to:
decode the preamble based on the determined one of the plurality of different predetermined combinations of the parameters to obtain signaling data of a payload of the frame, and
decode the payload using the signaling data of the payload.

19. The reception apparatus of claim 17, wherein a time domain displacement component of the SPP for each of the different predetermined combinations is equal to one.

20. The reception apparatus of claim 17, wherein the FFT size indicated by at least a first one of the plurality of 8-bit values is 8K, the FFT size indicated by at least a second one of the plurality of 8-bit values is 16K, and the FFT size indicated by at least a third one of the plurality of 8-bit values is 32K.

21. The reception apparatus of claim 17, wherein the frequency domain displacement in the predetermined combinations is predefined.

22. The reception apparatus of claim 17, wherein the bootstrap symbol has a predetermined number of eight bits.

23. The reception apparatus of claim 17, wherein the different predetermined combinations of the FFT size, the guard interval length, and the frequency domain displacement component of the SPP associated with the plurality of predetermined values are:

| Guard interval length (samples) | 8K FFT | 16K FFT | 32K FFT |
|---|---|---|---|
| 192 | SP16_1 | SP32_1 | SP32_1 |
| 384 | SP8_1 | SP16_1 | SP32_1 |
| 512 | SP6_1 | SP12_1 | SP24_1 |
| 768 | SP4_1 | SP8_1 | SP16_1 |
| 1024 | SP3_1 | SP6_1 | SP12_1 |
| 1536 | SP4_1 | SP4_1 | SP8_1 |
| 2048 | SP3_1 | SP3_1 | SP6_1 |
| 2432 | NA | SP3_1 | SP6_1 |
| 3072 | NA | SP4_1 | SP3_1, SP8_1 |
| 3648 | NA | SP4_1 | SP3_1, SP8_1 |
| 4096 | NA | SP3_1 | SP3_1 |
| 4864 | NA | NA | SP3_1. |

24. The reception apparatus of claim 19, wherein the different predetermined combinations include at least one combination for each of a plurality of guard intervals.

* * * * *